(12) United States Patent
Kuba et al.

(10) Patent No.: US 9,450,793 B2
(45) Date of Patent: Sep. 20, 2016

(54) DEVICE AND METHOD OF SEQUENCE DETECTION FOR FREQUENCY-SHIFT KEYING

(71) Applicant: Fraunhofer-Gesellschaft zur Foerderung der angewandten Forschung e.V., Munich (DE)

(72) Inventors: Matthias Kuba, Nuremberg (DE); Matthias Klatt, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/647,757

(22) Filed: May 27, 2015

(65) Prior Publication Data

US 2015/0341195 A1 Nov. 26, 2015

Related U.S. Application Data

(63) Continuation of application No. PCT/EP2013/074548, filed on Nov. 25, 2013.

(30) Foreign Application Priority Data

Nov. 28, 2012 (DE) .................. 10 2012 221 798

(51) Int. Cl.
*H04L 27/14* (2006.01)
*H04L 27/148* (2006.01)
*H04L 27/10* (2006.01)
*H04L 27/144* (2006.01)

(52) U.S. Cl.
CPC ............. *H04L 27/14* (2013.01); *H04L 27/148* (2013.01); *H04L 27/10* (2013.01); *H04L 27/106* (2013.01); *H04L 27/144* (2013.01)

(58) Field of Classification Search
CPC ..... H04L 27/14; H04L 27/16; H04L 27/144; H04L 27/148; H04L 27/10; H04L 27/106
See application file for complete search history.

(56) References Cited

U.S. PATENT DOCUMENTS 4,292,275 A * 9/1981 Forster .................. C01B 11/025
422/198
4,423,519 A * 12/1983 Bennett, Jr. ............. H04L 27/14
324/76.68

(Continued)

OTHER PUBLICATIONS

International Search Report dated Feb. 18, 2014 from PCT/EP2013/074548.

(Continued)

*Primary Examiner* — Sophia Vlahos
(74) *Attorney, Agent, or Firm* — Allen J. Moss; Squire Patton Boggs (US) LLP

(57) ABSTRACT

A device for determining an encoded data sequence as a determined data sequence is provided. The encoded data sequence is encoded by an input signal frequency-modulated in accordance with a modulation rule. The encoded data sequence has a plurality of data elements. The device has a filter unit for filtering the frequency-modulated input signal in order to obtain a first frequency-filtered channel signal and a second frequency-filtered channel signal. Additionally, the device has an evaluation unit configured to associate, for each known data sequence of a quantity of known data sequences, two channel-specific signal-to-noise distance values to this known data sequence. Furthermore, the evaluation unit is configured to select from the plurality of known data sequences a known data sequence as the determined data sequence to which is associated a channel-specific signal-to-noise distance value which is greater than another channel-specific signal-to-noise distance value associated to another one of the known data sequences.

23 Claims, 6 Drawing Sheets

(56) References Cited

U.S. PATENT DOCUMENTS

| | | |
|---|---|---|
| 4,435,821 A | 3/1984 | Ito et al. |
| 5,063,571 A | 11/1991 | Vancraeynest |
| 5,701,332 A | 12/1997 | Decrouez |
| 5,748,036 A * | 5/1998 | Lee ................... H04L 27/148 329/300 |
| 6,487,260 B1 * | 11/2002 | Schweickert ......... H04L 27/148 375/334 |
| 6,493,398 B1 * | 12/2002 | Erisman ................ H04L 27/02 375/295 |
| 6,996,218 B2 * | 2/2006 | Chen ................... H04L 27/156 379/142.01 |
| 7,239,675 B2 * | 7/2007 | Zehavi ................. H04L 27/22 329/300 |
| 7,715,500 B2 * | 5/2010 | Akahori ............... H04L 27/148 375/334 |
| 8,446,986 B2 * | 5/2013 | Veronesi .............. H04L 25/067 375/316 |
| 2005/0105597 A1 | 5/2005 | Hwang et al. |
| 2005/0157777 A1 | 7/2005 | Mizuno |
| 2006/0193402 A1 * | 8/2006 | Lee ..................... H04L 27/2014 375/336 |
| 2010/0254304 A1 | 10/2010 | Poegel et al. |

OTHER PUBLICATIONS

Schaub, T.; "Spread Frequency Shift Keying"; IEEE Transactions on Communications; Feb. 1, 1994.

* cited by examiner

DEVICE AND METHOD OF SEQUENCE DETECTION FOR FREQUENCY-SHIFT KEYING

CROSS-REFERENCE TO RELATED APPLICATIONS

This application is a continuation of copending International Application No. PCT/EP2013/074548, filed Nov. 25, 2013, which is incorporated herein by reference in its entirety, and additionally claims priority from German Application No. 10 2012 221 798.3, filed Nov. 28, 2012, which is also incorporated herein by reference in its entirety.

BACKGROUND OF THE INVENTION

The present invention relates to frequency-shift keying and, in particular, to a device and a method of sequence detection of frequency-shift-keyed signals.

Frequency-shift-keying is employed in, for example, telecommunication for encoding messages and addresses. Frequency-shift keying is gaining in importance in this context.

Transmitting data by means of frequency-shift keying is performed in accordance with a modulation rule. In binary frequency-shift keying (BFSK) in accordance with known technology, for example, a sinusoidal signal of a frequency $f_0$ is emitted by a transmitter in the case of a logic value "0", and a sinusoidal signal of a frequency is emitted in the case of a logic value "1". $f_0$ here may be considered to be a first encoding frequency: $f_1$ may be considered to be a second encoding frequency. $f_0$ and $f_1$ are of different values: $f_0 \neq f_1$. In the case of a logic value "0", a signal $$s_0(t) = A \cos(2\pi f_0 t + \theta_0) \quad (1)$$

is emitted by the transmitter for a bit duration $T_b$, with a logic value "1", in contrast, the signal $$s_1(t) = A \cos(2\pi f_1 t + \theta_1) \quad (2)$$

with phase positions of the two signals $\theta_0$ and $\theta_1$ which are generally different, and an amplitude A, as is exemplarily described in

[1] F. Xiong, *Digital Modulation Techniques*, Artech House, Inc., second edition, 2006.

The receiver may then, using the frequency, derive from the signal received whether a logic value "0" or "1" has been transmitted by the transmitter.

Spread frequency-shift keying (SFSK) receivers are a special variation of FSK receivers. For SFSK receivers, see in particular:

[2] T. Schaub, *Spread Frequency Shift Keying*, IEEE Transactions on Communications, February 1994, Edition 42, Number 234, pp. 1056-1064.

In conventional FSK receivers, a decision as to which logic value has been transmitted by a transmitter is made using a threshold value comparison, irrespective of whether the phase positions are known (coherent FSK receiver) or not (incoherent FSK receiver). If, in the period $T_b$, there is more signal energy near the frequency $f_0$, the receiver will decide for the logic value "0"; if, however, there is more signal energy near $f_1$, the receiver will decide for the logic value "1".

When one out of M known sequences having a length of $N_S$ successive and FSK-modulated logic values is transmitted by the transmitter, a conventional receiver will try to determine the sequence transmitted by the transmitter by comparing the logic sequence determined from the signal received in accordance with the principle described above to all the M known sequences and selecting that sequence for which similarity to the sequence received is the greatest. This is generally done by calculating the correlation coefficients (or quantities proportional to said quantity) between the sequence received and all M known sequences. When assuming at M known sequences $R_i$, known to both the transmitter and the receiver, of a length $N_S$, the decision of the receiver may, starting at the sequence S received of a length $N_S$ for one of the M reference sequences, be expressed as follows:

$$\delta = \underset{i}{\mathrm{argmax}} \left( \sum_{j=1}^{N_S} R_{ij} S_j \right), \quad (3)$$

$$i = 1, 2, \ldots, M.$$

This means that the receiver calculates, for each of the M reference sequences $R_i$, the correlation to the sequence S received and subsequently decides for that sequence $R_i$, with $i=\delta$, from R for which the correlation value will be the greatest. R here describes a table of all M reference sequences $R_i$ and $R_j$ describes the j-th element of $R_i$. When S is the sequence transmitted by the transmitter, the receiver has made the correct decision, if $R_\delta=S$, otherwise the receiver has made the wrong decision.

The procedure described here of conventional receivers is of particular disadvantage when the transmission characteristics of the entire system including transmitter, transmission channel and receiver do not represent a constant function of frequency.

The object underlying the present invention is providing improved concepts of sequence detection for frequency-shift keying. Both with frequency-independent and frequency-selective transmission behavior, correct decisions of sequence detection are to be made with high probability, without the obligation of the receiver having to know the transmission behavior and having to know the phase positions of the signals received.

SUMMARY

According to an embodiment, a device for determining an encoded data sequence as a determined data sequence, the encoded data sequence being encoded by an input signal frequency-modulated in accordance with a modulation rule, the encoded data sequence having a plurality of data elements, may have: a filter unit for filtering the frequency-modulated input signal in order to obtain a first frequency-filtered channel signal and a second frequency-filtered channel signal, an evaluation unit configured to associate, for each known data sequence of a set of known data sequences, two channel-specific signal-to-noise distance values to this known data sequence, wherein the evaluation unit is configured to determine, for each known data sequence of the set of known data sequences, a first one of the two channel-specific signal-to-noise distance values associated to this data sequence as a first channel-specific signal-to-noise distance value of this known data sequence based on this known data sequence and based on the first frequency-filtered channel signal, wherein the evaluation unit is configured to determine, for each known data sequence of the set of known data sequences, a second one of the two channel-specific signal-to-noise distance values associated to this data sequence as a second channel-specific signal-to-noise distance value of this known data sequence based on this known data sequence and based on the second frequency-filtered channel signal, and wherein the evaluation unit is configured to select from the set of known data sequences a known data sequence as the determined data sequence to which is associated a channel-specific signal-to-noise distance value which is greater than another channel-specific signal-to-noise distance value associated to another one of the known data sequences.

According to another embodiment, a device for recognizing a network address encoded by a frequency-modulated input signal may have: an interface unit for receiving the frequency-modulated input signal, and a device as mentioned above for determining a data sequence encoded by the frequency-modulated input signal which has a plurality of data elements, the encoded data sequence designating a network address, wherein the evaluation unit of the device as mentioned above is configured to determine a data sequence signal-to-noise distance value for each known data sequence of a set of known data sequences, wherein each known data sequence of the set of known data sequences designates a network address each.

According to another embodiment, a method for determining an encoded data sequence as a determined data sequence, the encoded data sequence being encoded by an input signal frequency-modulated in accordance with a modulation rule, the encoded data sequence having a plurality of data elements, may have the steps of: filtering the frequency-modulated input signal in order to obtain a first frequency-filtered channel signal and a second frequency-filtered channel signal, for each known data sequence of a set of known data sequences, associating two channel-specific signal-to-noise distance values to this known data sequence, wherein, for each known data sequence of the set of known data sequences, a first one of the two channel-specific signal-to-noise distance values associated to this data sequence is determined as a first channel-specific signal-to-noise distance value of this known data sequence based on this known data sequence and based on the first frequency-filtered channel signal, wherein, for each known data sequence of the set of known data sequences, a second one of the two channel-specific signal-to-noise distance values associated to this data sequence is determined as a second channel-specific signal-to-noise distance value of this known data sequence based on this known data sequence and based on the second frequency-filtered channel signal, and wherein from the set of known data sequences a known data sequence is selected as the determined data sequence to which is associated a channel-specific signal-to-noise distance value which is greater than another channel-specific signal-to-noise distance value associated to another one of the known data sequences.

Another embodiment may have a computer program for performing the above method when the computer program is executed on a computer or signal processor.

Embodiments of the invention are based on the finding that, for detecting frequency-shift-keyed sequences (bit sequences) starting from different reference sequences, estimate values for the signal-to-noise distance of the signal received are calculated and the decision for a certain sequence is made using a maximum value decision.

Both with frequency-independent and frequency-selective transmission behavior, correct decisions are made with high probability, without the receiver having to know the transmission behavior. Furthermore, the receiver does not have to know the phase positions of the signals received.

The inventive concepts allow a receiver, for detecting a frequency-shift-keyed sequence starting from a finite number of sequences available, to calculate estimate values for the signal-to-noise distance in all the frequency channels and to make a decision using the maximum estimate value.

The inventive concepts may be employed in frequency-shift keying systems in which the transmission characteristics of the modulated signals either represent a constant function of frequency or comprise different disturbance and attenuation behaviors for different frequencies, wherein, however, these characteristics are not known to the receiver. Using the inventive method, a receiver is able to recognize the sequence transmitted by the transmitter from a finite number of sequences available correctly with high probability, without knowing the transmission characteristics.

Particular advantages result when using spread frequency-shift keying (SFSK) receivers. When the inventive concepts are used for addressing receivers and are provided with an, exemplarily downstream, so-called spread frequency-shift keying receiver, the channel estimate method necessitated by an SFSK receiver may additionally be omitted since the results of this estimate method will result directly from addressing the receiver using the inventive method.

For reasons of simplicity, in the embodiments, applying the inventive method to binary frequency-shift keying will be explained in greater detail. A description of extending the inventive sequence detection method to higher-value frequency-shift keying will follow later on. In a particularly advantageous embodiment of the invention, the inventive method may be used for transmission channels the transmission characteristics of which do not represent a constant function of frequency and the transmission characteristics of which are not known to the receiver.

In accordance with an embodiment, the evaluation unit may be configured to select one of the known data sequences as the determined data sequence to which is associated a channel-specific signal-to-noise distance value which is greater than any other channel-specific signal-to-noise distance value associated to another one of the known data sequences of the set of known data sequences.

In accordance with an embodiment, the filter unit for filtering the frequency-modulated input signal may be configured to obtain the first frequency-filtered channel signal with a first center frequency and the second frequency-filtered channel signal with a second center frequency. In addition, the filter unit may be implemented such that a frequency portion of the first center frequency in the second frequency-filtered channel signal is zero or smaller than a frequency portion of the first center frequency in the first frequency-modulated channel signal. Thus, the filter unit may be implemented such that a frequency portion of the second center frequency in the first frequency-filtered channel signal is zero or smaller than a frequency portion of the second center frequency in the second frequency-modulated channel signal.

A center frequency may thus be a mean value, such as, for example, a geometrical mean value, between the lower and upper cutoff frequencies of a frequency band.

In accordance with an embodiment, the evaluation unit may be configured to determine, for each of the known data sequences of the set of known data sequences, a set of channel-specific signal-to-noise distance values of this known data sequence each, wherein a set of channel-specific signal-to-noise distance values of this known data sequence includes the first channel-specific signal-to-noise distance value of this known data sequence and the second channel-specific signal-to-noise distance value of this known data sequence. The evaluation unit may be configured to select, for each of the known data sequences of the set of known data sequences, from the set of channel-specific signal-to-noise distance values a greatest channel-specific signal-to-noise distance value as a data sequence signal-to-noise distance value of this known data sequence such that no other channel-specific signal-to-noise distance value from the set of channel-specific signal-to-noise distance values of this known data sequence is greater. Furthermore, the evaluation unit may additionally be configured to select from the set of known data sequences that known data sequence as the determined data sequence such that there is no other known data sequence from the set of known data sequences the data sequence signal-to-noise distance value of which is greater than the data sequence signal-to-noise distance value of the determined data sequence.

In another embodiment, the evaluation unit may be configured to determine, for each of the known data sequences, a first signal power value of this known data sequence in dependence on this known data sequence and on the first frequency-filtered channel signal. Thus, the evaluation unit may be configured to determine, for each of the known data sequences, the first channel-specific signal-to-noise distance value of this known data sequence in dependence on the first signal power value of this known data sequence. In addition, the evaluation unit may be configured to determine, for each of the known data sequences, a second signal power value of this known data sequence in dependence on this known data sequence and on the second frequency-filtered channel signal. In addition, the evaluation unit may be configured to determine, for each of the known data sequences, the second channel-specific signal-to-noise distance value of this known data sequence in dependence on the second signal power value of this known data sequence.

In accordance with another embodiment, the evaluation unit may be configured to determine, for each of the known data sequences, a first noise power value of this known data sequence in dependence on this known data sequence and on the first frequency-filtered channel signal, wherein the evaluation unit may be configured to determine, for each of the known data sequences, the first channel-specific signal-to-noise distance value of this known data sequence in dependence on the first signal power value of this known data sequence and the first noise power value of this known data sequence such that the first channel-specific signal-to-noise distance value of this known data sequence indicates a size ratio of the first signal power value of this known data sequence relative to the first noise power value of this known data sequence. Additionally, the evaluation unit may be configured to determine, for each of the known data sequences, a second noise power value of this known data sequence in dependence on this known data sequence and on the second frequency-filtered channel signal, wherein the evaluation unit may be configured to determine, for each of the known data sequences, the second channel-specific signal-to-noise distance value of this known data sequence in dependence on the second signal power value of this known data sequence and the second noise power value of this known data sequence such that the second channel-specific signal-to-noise distance value of this known data sequence indicates a size ratio of the second signal power value of this known data sequence relative to the second noise power value of this known data sequence.

In another embodiment, the filter unit may comprise a first filter element having a first transmission or pass region for filtering the frequency-modulated input signal in order to obtain the first frequency-filtered channel signal, wherein the evaluation unit may be configured to determine, for each known data sequence of the known data sequences, the first signal power value of this known data sequence in dependence on a first group of first signal portions of the first channel signal, wherein the first group of first signal portions will comprise only such signal portions of the first channel signal for which this known data sequence indicates that a first data value of the encoded data sequence is encoded by these signal portions, in case the frequency-modulated input signal encodes this data sequence, wherein the first data value is encoded by signal portions comprising frequency portions which correspond to a first encoding frequency, wherein the first filter element is implemented such that the first encoding frequency is in the pass region of the first filter element. The evaluation unit may be configured to determine, for each known data sequence of the known data sequences, the first noise power value of this known data sequence in dependence on a third group of third signal portions of the first channel signal, wherein the third group of third signal portions will comprise only such signal portions of the first channel signal for which this known data sequence indicates that the first data value of the encoded data sequence is not encoded by these signal portions, in case the frequency-modulated input signal encodes this data sequence.

In accordance with another embodiment, the filter unit may comprise a second filter element having a second pass region for filtering the frequency-modulated input signal in order to obtain the second frequency-filtered channel signal, wherein the evaluation unit may be configured to determine, for each known data sequence of the known data sequences, the second signal power value of this known data sequence in dependence on a second group of second signal portions of the second channel signal, wherein the second group of second signal portions will comprise only such signal portions of the second channel signal for which this known data sequence indicates that a second data value of the encoded data sequence is encoded by these signal portions, in case the frequency-modulated input signal encodes this data sequence, wherein the second data value is encoded by signal portions comprising frequency portions which correspond to a second encoding frequency, wherein the second filter element may be implemented such that the second encoding frequency is in the pass region of the second filter element, wherein the second filter element may be implemented such that the first encoding frequency is not in the pass region of the second filter element, wherein the first filter element may be implemented such that the second encoding frequency is not in the pass region of the first filter element. Thus, the evaluation unit may be configured to determine, for each known data sequence of the known data sequences, the second noise power value of this known data sequence in dependence on a fourth group of fourth signal portions of the second channel signal, wherein the fourth group of fourth signal portions will comprise only such signal portions of the second channel signal for which this known data sequence indicates that the second data value of the encoded data sequence is not encoded by these signal portions, in case the frequency-modulated input signal encodes this data sequence.

It is differentiated between the following terms:

A data value is one of possible values a data element of a data sequence may take. In the case of, for example, a binary data sequence, "0" and "1" are the data values a data element may take. Possible data values of the data elements of a data sequence may, however, exemplarily also be the values "0", "1", "2", "3", or numbers from "0" to "15". Data values do not need to be numbers, but may exemplarily also be letters. Exemplarily, a data sequence may comprise data elements which may take one of the data values "A", "B", "C" or "D". However, data values may exemplarily also be strings like, for example, the strings "LOW", "AVERAGE" and "HIGH". Every data element of the data sequence would then take one of the data values "LOW", "AVERAGE" or "HIGH". When subsequently a "logic value 0" or "logic value 1" is mentioned, this means data value 0 or data value 1.

The terms data sequence and data element are to be differentiated from the term data value. A data sequence includes a number of data elements. Thus, a data sequence may exemplarily include exactly four data elements, i.e. a first data element at a first position in the data sequence, a second data element at the second position in the data sequence, a third data element at the third position in the data sequence and a fourth data element at the fourth position in the data sequence. Each of the four data elements of the data sequence will then take exactly one data value.

Put briefly: a data sequence comprises a number of data elements. Each of the data elements takes one of several possible data values.

In one embodiment, the evaluation unit may be configured to calculate, for each of the known data sequences, the first channel-specific signal-to-noise distance value of this known data sequence by calculating:

$$\frac{\mu_{SN0} - \mu_{N0}}{\mu_{N0}}$$

or by calculating:

$$\frac{\mu_{SN0}}{\mu_{N0}}$$

wherein $\mu_{SN0}$ refers to the first signal power value of this known data sequence, and wherein $\mu_{N0}$ refers to the first noise power value of this known data sequence. $\mu_{SN0}$ exemplarily indicates the power in the channel $f_0$ measured during the 0 bit phases. This power measured exemplarily includes useful signal power and noise power.

In accordance with another embodiment, the evaluation unit may be configured to calculate, for each of the known data sequences, the second channel-specific signal-to-noise distance value of this known data sequence by calculating:

$$\frac{\mu_{SN1} - \mu_{N1}}{\mu_{N1}}$$

or by calculating:

$$\frac{\mu_{SN1}}{\mu_{N1}}$$

wherein $\mu_{SN1}$ refers to the second signal power value of this known data sequence, and wherein $\mu_{N1}$ refers to the second noise power value of this known data sequence. $\mu_{N1}$ exemplarily indicates the power in the channel $f_1$ measured during the 1 bit phases. This power measured exemplarily includes useful signal power and noise power.

In one embodiment, the evaluation unit may be configured to calculate, for each known data sequence of the known data sequences, the first signal power value of this known data sequence in accordance with the following formula:

$$\mu_{SN0} = \frac{1}{K \sum_{j=1}^{N_S} |R_{ij} - 1|} \sum_{j=1}^{N_S} \sum_{n=(j-1)K}^{jK-1} r_0^2[n]|R_{ij} - 1|,$$

wherein each of the known data sequences is a binary data sequence the data elements of which take only data values which are either 0 or 1, wherein each known data sequence of the set of known data sequences comprises an equal number of $N_S$ data elements, wherein K corresponds to the number of samples per data element, wherein $r_0^2[n]$ refers to the squared n-th channel signal value of the first channel signal, and wherein $R_{i,j}$ is a data value of a j-th data element of an i-th data sequence of the known data sequences, wherein the i-th data sequence is that data sequence of the known data sequences for which the first signal power value is calculated.

In accordance with another embodiment, the evaluation unit may be configured to calculate, for each known data sequence of the known data sequences, the first noise power value of this known data sequence in accordance with the following formula:

$$\mu_{N0} = \frac{1}{K \sum_{j=1}^{N_S} R_{ij}} \sum_{j=1}^{N_S} \sum_{n=(j-1)K}^{jK-1} r_0^2[n] R_{ij},$$

wherein K corresponds to the number of samples per data element.

In one embodiment, the evaluation unit may be configured to calculate, for each known data sequence of the known data sequences, the second signal power value of this known data sequence in accordance with the following formula:

$$\mu_{SN1} = \frac{1}{K \sum_{j=1}^{N_S} R_{ij}} \sum_{j=1}^{N_S} \sum_{n=(j-1)K}^{jK-1} r_1^2[n] R_{ij},$$

and the second noise power value in accordance with the following formula:

$$\mu_{N1} = \frac{1}{K \sum_{j=1}^{N_S} |R_{ij} - 1|} \sum_{j=1}^{N_S} \sum_{n=(j-1)K}^{jK-1} r_1^2[n]|R_{ij} - 1|.$$

wherein K corresponds to the number of samples per data element, and wherein $r_1^2[n]$ refers to a squared n-th channel signal value of the second channel signal.

In accordance with an embodiment, the filter unit for filtering the frequency-modulated input signal may be configured to obtain at least the first frequency-filtered channel signal, the second frequency-filtered channel signal and a third frequency-filtered channel signal. The evaluation unit may be configured to associate, for each known data sequence of a set of known data sequences, three channel-specific signal-to-noise distance values to this known data sequence, wherein the evaluation unit may be configured to determine, for each known data sequence of a set of known data sequences, a third one of the three channel-specific signal-to-noise distance values associated to this data sequence as a third channel-specific signal-to-noise distance value of this known data sequence based on this known data sequence and based on the third frequency-filtered channel signal, and wherein the evaluation unit may be configured to select from the set of known data sequences that known data sequence as the determined data sequence to which is associated a channel-specific signal-to-noise distance value which is greater than another channel-specific signal-to-noise distance value associated to another one of the known data sequences.

In one embodiment, the filter unit for filtering the frequency-modulated input signal may be configured to obtain the first frequency-filtered channel signal, the second frequency-filtered channel signal, a third frequency-filtered channel signal and a fourth frequency-filtered channel signal. The evaluation unit may be configured to associate, for each known data sequence of a set of known data sequences, four channel-specific signal-to-noise distance values to this known data sequence. In addition, the evaluation unit may be configured to determine, for each known data sequence of a set of known data sequences, a third one of the four channel-specific signal-to-noise distance values associated to this data sequence as a third channel-specific signal-to-noise distance value of this known data sequence based on this known data sequence and based on the third frequency-filtered channel signal. In addition, the evaluation unit may be configured to determine, for each known data sequence of a set of known data sequences, a fourth one of the four channel-specific signal-to-noise distance values associated to this data sequence as a fourth channel-specific signal-to-noise distance value of this known data sequence based on this known data sequence and based on the fourth frequency-filtered channel signal. In addition, the evaluation unit may be configured to select from the set of known data sequences the known data sequence as the determined data sequence to which is associated a channel-specific signal-to-noise distance value greater than another channel-specific signal-to-noise distance value associated to another one of the known data sequences.

In accordance with an embodiment, the device may be configured to determine an encoded data sequence which is encoded by the frequency-modulated input signal which is frequency-modulated by the modulation rule, the modulation rule being frequency-shift keying. Thus, in a special embodiment, the device may be configured to determine an encoded data sequence which is encoded by the frequency-modulated input signal which is frequency-modulated by 4-FSK, 4-FSK being the modulation rule. In another special embodiment, the device may be configured to determine an encoded data sequence which is encoded by the frequency-modulated input signal which is frequency-modulated by 8-FSK, 8-FSK being the modulation rule.

In embodiments of the present invention, the frequency-modulated input signal may also be frequency-modulated by other modulation rules, such as, for example, any other frequency modulation method.

In accordance with an embodiment, the filter unit may additionally comprise a first filter element in order to obtain the first frequency-filtered channel signal by filtering the frequency-modulated input signal. Thus, the filter unit may comprise a second filter element in order to obtain the second frequency-filtered channel signal by filtering the frequency-modulated input signal, wherein the evaluation unit may comprise a first squaring unit for squaring the first frequency-filtered channel signal in order to obtain a first squared channel signal, wherein the evaluation unit may comprise a second squaring unit for squaring the second frequency-filtered channel signal in order to obtain a second squared channel signal, wherein the evaluation unit may further comprise a storage unit for storing the set of known data sequences. The evaluation unit may additionally comprise a first signal-to-noise distance determining unit in order to obtain, for each known data sequence of the set of known data sequences, the first channel-specific signal-to-noise distance value of this data sequence based on this known data sequence and the first squared channel signal. The evaluation unit may additionally further comprise a second signal-to-noise distance determining unit in order to obtain, for each known data sequence of the set of known data sequences, the second channel-specific signal-to-noise distance value of this data sequence based on this known data sequence and the second squared channel signal. The evaluation unit may additionally comprise an argmax unit for determining a maximum signal-to-noise distance value, wherein the evaluation unit may additionally comprise a data sequence determining unit for selecting from the set of known data sequences that known data sequence as the determined data sequence to which is associated the maximum signal-to-noise distance value.

In one embodiment, the device additionally comprises a receiver for spread frequency-shift keying configured to receive the frequency-modulated input signal.

In addition, a device for recognizing a network address which is encoded by a frequency-modulated input signal is provided. The device for recognizing a network address includes an interface unit for receiving the frequency-modulated input signal and a device in accordance with one of the embodiments described above for determining a data sequence encoded by the frequency-modulated input signal which comprises a plurality of data elements, the encoded data sequence referring to a network address. The evaluation unit of the device here is configured to determine a data sequence signal-to-noise distance value for each known data sequence of a set of known data sequences, wherein each known data sequence of the set of known data sequences refers to a network address each.

Furthermore, a method for determining an encoded data sequence as a determined data sequence is provided, the encoded data sequence being encoded by an input signal frequency-modulated in accordance with a modulation rule, wherein the encoded data sequence comprises a plurality of data elements, the method comprising the steps of:
  filtering the frequency-modulated input signal in order to obtain a first frequency-filtered channel signal and a second frequency-filtered channel signal,
  for each known data sequence of a set of known data sequences, associating two channel-specific signal-to-noise distance values to this known data sequence,
  wherein, for each known data sequence of the set of known data sequences, a first one of the two channel-specific signal-to-noise distance values which are associated to this data sequence is determined as a first channel-specific signal-to-noise distance value of this known data sequence based on this known data sequence and based on the first frequency-filtered channel signal, wherein, for each known data sequence of the set of known data sequences, a second one of the two channel-specific signal-to-noise distance values which are associated to this data sequence is determined as a second channel-specific signal-to-noise distance value of this known data sequence based on this known data sequence and based on the second frequency-filtered channel signal, and wherein from the set of known data sequences a known data sequence is selected as the determined data sequence to which is associated a channel-specific signal-to-noise distance value which is greater than another channel-specific signal-to-noise distance value associated to another one of the known the data sequences.

A computer program for performing the method described above when the computer program is executed on a computer or signal processor is provided.

BRIEF DESCRIPTION OF THE DRAWINGS

Embodiments will be discussed below referring to the appended drawings, in which.

DETAILED DESCRIPTION OF THE INVENTION

Figure 1:
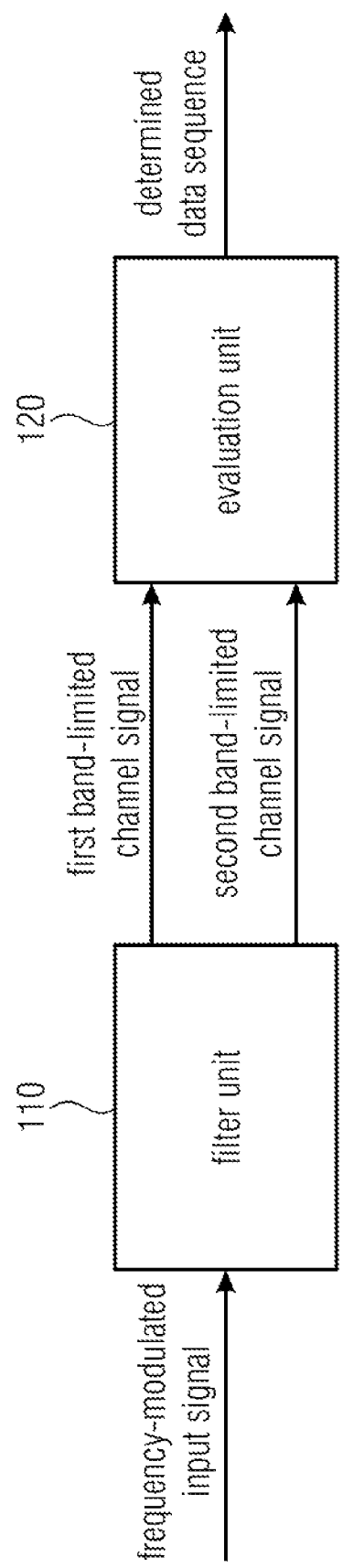
FIG. 1 shows a device for determining as a determined data sequence a data sequence encoded by a frequency-modulated input signal which comprises a plurality of data elements in accordance with an embodiment.

FIG. 1 shows a device for determining an encoded data sequence as a determined data sequence. The encoded data sequence is encoded by an input signal frequency-modulated in accordance with a modulation rule. The encoded data sequence includes a plurality of data elements.

The device includes a filter unit 110 for filtering the frequency-modulated input signal in order to obtain a first frequency-filtered channel signal and a second frequency-filtered channel signal.

In addition, the device comprises an evaluation unit 120 configured to associate, for each known data sequence of a set of known data sequences, two channel-specific signal-to-noise distance values to this known data sequence.

The evaluation unit 120 is configured to determine, for each known data sequence of the set of known data sequences, a first one of the two channel-specific signal-to-noise distance values associated to this data sequence as a first channel-specific signal-to noise distance value of this known data sequence based on this known data sequence and based on the first frequency-filtered channel signal.

Additionally, the evaluation unit 120 is configured to determine, for each known data sequence of the set of known data sequences, a second one of the two channel-specific signal-to-noise distance values associated to this data sequence as a second channel-specific signal-to-noise distance value of this known data sequence based on this known data sequence and based on the second frequency-filtered channel signal.

Furthermore, the evaluation unit 120 is configured to select from the set of known data sequences a known data sequence as the determined data sequence to which is associated a channel-specific signal-to-noise distance value which is greater than another channel-specific signal-to-noise distance value associated to another one of the known data sequences.

The following terms are to be differentiated:

The encoded data sequence is that data sequence which is really encoded in the frequency-modulated input signal.

The set of known data sequences is the set of all the data sequences which may basically be present in the frequency-modulated input signal. When, for example, the data sequence comprises 4 data elements and the data elements comprise no other data values than the binary data values 0 and 1, the set of known data sequences does not necessarily need to contain all 16 different combinations of zeros and ones. Rather, the agreement is advantageous according to which some data sequences, such as, for example "0000" and "1111" are not encoded in the frequency-modulated input signal which will then not belong to the set of known data sequences either.

The determined data sequence is that data sequence from the set of known data sequences which the device has identified as that data sequence which is encoded in the frequency-modulated input signal. This means that this is that data sequence which the device believes to be encoded by the frequency-modulated input signal.

In accordance with an embodiment, the evaluation unit may be configured to select as the determined data sequence one of the known data sequences to which is associated a channel-specific signal-to-noise distance value which is greater than any other channel-specific signal-to-noise distance value which is associated to another one of the known data sequences of the set of known data sequences. In this embodiment, after having determined the channel-specific signal-to-noise distance values for all the known data sequences, the evaluation unit exemplarily determines the greatest channel-specific signal-to-noise distance value of all the channel-specific signal-to-noise distance values (there is no greater signal-to-noise distance value associated to another known data sequence). The known data sequence to which this greatest signal-to-noise distance value is associated is then selected by the evaluation unit as the determined data sequence.

In accordance with an embodiment, the filter unit for filtering the frequency-modulated input signal may be configured to obtain the first frequency-filtered channel signal with a first center frequency and the second frequency-filtered channel signal with a second center frequency. Additionally, the filter unit may be implemented such that a frequency portion of the first center frequency in the second frequency-filtered channel signal is zero or smaller than a frequency portion of the first center frequency in the first frequency-modulated channel signal. Thus, the filter unit may be implemented such that a frequency portion of the second center frequency in the first frequency-filtered channel signal is zero or smaller than a frequency portion of the second center frequency in the second frequency-modulated channel signal.

In accordance with an embodiment, the evaluation unit may be configured to determine, for each of the known data sequences of the set of known data sequences, a set of channel-specific signal-to-noise distance values of this known data sequence each, wherein the set of channel-specific signal-to-noise distance values of this data sequence includes the first channel-specific signal-to-noise distance value of this known data sequence and the second channel-specific signal-to-noise distance value of this known data sequence. Thus, the evaluation unit may be configured to select, for each of the known data sequences of the set of known data sequences, from the set of channel-specific signal-to-noise distance values of this known data sequence a greatest channel-specific signal-to-noise distance value as a data sequence signal-to-noise distance value of this known data sequence such that no other channel-specific signal-to-noise distance value from the set of channel-specific signal-to-noise distance values of this known data sequence is greater. Furthermore, the evaluation unit in this embodiment may also be configured to select from the set of known data sequences that known data sequence as determined the data sequence such that there is no other known data sequence from the set of known data sequences the data sequence signal-to-noise distance value of which is greater than the data sequence signal-to-noise distance value of the determined data sequence.

Thus, in this embodiment, a data sequence signal-to-noise distance value is determined for each of the known data sequences (i.e. the data sequence candidates) based on this known data sequence, based on the first frequency-filtered channel signal and based on the second frequency-filtered channel signal.

The data sequence signal-to-noise distance value for each of the known data sequences here may exemplarily be determined such that a set of channel-specific signal-to-noise distance values each is determined for each of the known data sequences, such as, for example, for each of the frequency-filtered channel signals a channel-specific signal-to-noise distance value for the respective data sequence considered.

Thus, in a specific embodiment, the evaluation unit 120 may exemplarily be configured to determine, for each of the known data sequences of the set of known data sequences, at least a first channel-specific signal-to-noise distance value of this known data sequence for the first frequency-filtered channel signal as a first element of the set of channel-specific signal-to-noise distance values of this known data sequence in dependence on the first band-limited channel signal and this known data sequence and to determine at least a second channel-specific signal-to-noise distance value of this known data sequence for the second frequency-filtered channel signal as a second element of the set of the channel-specific signal-to-noise distance values of this known data sequence in dependence on the second frequency-filtered-channel signal and this known data sequence.

In one embodiment, the evaluation unit 120 may additionally be configured to select from the set of channel-specific signal-to-noise distance values a greatest channel-specific signal-to-noise distance value as the data sequence signal-to-noise distance value of this known data sequence such that no other channel-specific signal-to-noise distance value from the set of channel-specific signal-to-noise distance values of this known data sequence is greater.

An underlying principle is as follows:

It is assumed here that, when a first data value is encoded in a signal portion of the frequency-modulated input signal, such as, for example, a "0", the frequency-modulated input signal has been generated such that the frequency-modulated input signal comprises frequency portions in the range of a first encoding frequency $f_0$, wherein these frequency portions are still present in the first frequency-filtered channel signal after filtering by the filter element, but no longer in the second frequency-filtered channel signal or only at reduced power. Correspondingly, the corresponding signal portions in the first frequency-filtered channel signal will comprise a correspondingly large amount of signal energy, exemplarily a correspondingly large mean signal energy. Thus, the signal energy of the signal portion may exemplarily be the sum of the squared channel signal values of this signal portion. The mean signal energy of the signal portion may exemplarily be the averaged sum of the squared channel signal values of this signal portion.

In addition, it is assumed that, when a second data value is encoded in a signal portion of the frequency-modulated input signal, i.e., for example, a "1" has been encoded, the frequency-modulated input signal has been generated such that the frequency-modulated input signal comprises frequency portions in the range of a second encoding frequency $f_1$, wherein these frequency portions are still present in the second frequency-filtered channel signal after filtering by the filter unit, but no longer in the first frequency-filtered channel signal or only at reduced power. Correspondingly, the corresponding signal portions in the first frequency-filtered channel signal will comprise no or only a correspondingly small amount of signal energy, such as, for example, no or only a correspondingly small amount of signal energy.

The filter unit may exemplarily comprise a first filter element with a first pass region for filtering the frequency-modulated input signal in order to obtain the first frequency-filtered channel signal.

In addition, a filter unit may exemplarily comprise a second filter element with a second transmission or pass region, different from the first pass region, for filtering the frequency-modulated input signal in order to obtain the second frequency-filtered channel signal.

The first filter element here may exemplarily be implemented such that the first encoding frequency $f_0$ is in the pass region of the first filter element, but the second encoding frequency $f_1$ is not in the pass region of the first filter element.

The second filter element here may exemplarily be implemented such that the second encoding frequency $f_1$ is in the pass region of the second filter element, but the first encoding frequency $f_0$ is not in the pass region of the second filter element.

In addition, it is assumed that it is known for the device which signal region of the frequency-modulated input signal encodes the encoded data sequence. In order to determine which signal region of the frequency-modulated input signal encodes the encoded data sequence, methods for synchronizing, as are generally known from known technology, may be employed, for example.

The device will then make the hypothesis that the (examined) known data sequence just considered really is the data sequence encoded in the frequency-modulated input signal.

Exemplarily, the evaluation unit may then determine a first signal power value for the first frequency-filtered channel signal which determines the, exemplarily averaged, signal energy for only such signal portions of the first frequency-filtered channel signal which, in accordance with the known data sequence just considered, encode the first data value. The first signal power value will be particularly great for that of the known data sequences which really is the encoded data sequence.

Additionally, the evaluation unit may exemplarily determine a first noise power value for the first frequency-filtered channel signal which determines the, exemplarily averaged, signal energy only for such signal portions of the first frequency-filtered channel signal which, in accordance with the known data sequence just considered, do not encode the first data value. The first noise power value will be particularly small for that of the known data sequences which really is the encoded data sequence.

The evaluation unit may determine a first channel-specific signal-to-noise distance value for each of the known data sequences. Exemplarily, the first channel-specific signal-to-noise distance value may be formed based on a quotient comprising the first signal power value in the numerator and the first noise power value in the denominator. The first channel-specific signal-to-noise distance value of a known data sequence considered will be particularly great when this data sequence really is the data sequence encoded in the frequency-modulated input signal.

In addition, it is assumed that when the second data value is encoded in a signal portion of the frequency-modulated input signal, such as, for example, a "1", the frequency-modulated input signal has been generated such that the frequency-modulated input signal comprises frequency portions in the region of a second center frequency of the second frequency-filtered channel signal. Correspondingly, the respective signal portions in the second frequency-filtered channel signal will comprise a correspondingly great signal energy, such as, for example, a correspondingly great mean signal energy.

It is also assumed that when the second data value is not encoded in a signal portion of the frequency-modulated input signal, when, for example, a "0" has been encoded, the frequency-modulated input signal has been generated such that the frequency-modulated input signal in the region of a second center frequency of the second frequency-filtered channel signal has no or only small frequency portions. Correspondingly, the respective signal portions in the second frequency-filtered channel signal will comprise no or only a correspondingly small signal energy, such as, for example, no or only a correspondingly small mean signal energy.

In analogy to the above expositions, the evaluation unit may then determine a second signal power value for the second frequency-filtered channel signal which determines the, for example averaged, signal energy only for such signal portions of the second frequency-filtered channel signal which, in accordance with the known data sequence just considered, encode the second data value. The second signal power value will be particularly great for that of the known data sequences which really is the encoded data sequence.

Additionally, the evaluation unit may then determine a second noise power value for the second frequency-filtered channel signal which determines the, for example averaged, signal energy only for such signal portions of the second frequency-filtered channel signal which, in accordance with the known data sequence just considered, do not encode the second data value. The second noise power value will be particularly small for that of the known sequences which really is the encoded data sequence.

The evaluation unit may determine a second channel-specific signal-to-noise distance value for each of the known data sequences. The second channel-specific signal-to-noise distance value may exemplarily be determined based on a quotient comprising the second signal power value in the numerator and the second noise power value in the denominator. The second channel-specific signal-to-noise distance value of a known data sequence considered will be particularly great when this data sequence really is the data sequence encoded in the frequency-modulated input signal.

In an embodiment, the evaluation unit may then determine, for each known data sequence, a data sequence signal-to-noise distance value exemplarily by selecting the greatest of all channel-specific signal-to-noise distance values of this data sequence as the data sequence signal-to-noise distance value of the data sequence. Selecting the data sequence signal-to-noise distance value from a set of channel-specific signal-to-noise distance values is of advantage in that, when one of the channels considered is disturbed to a greater extent than another channel considered, such as, for example, noisy, determining the encoded data sequence will still be possible reliably.

The concepts illustrated above will also function when the data elements of the data sequence may take more than two data values, exemplarily by the filter unit in this case generating more than two channel signals.

The data sequence may exemplarily include data values which may take four different data values, such as, for example, "0", "1", "2", "3". Correspondingly, the filter unit would filter the frequency-modulated input signal in order to obtain four channel signals which each comprise a center frequency which represents one of the data values each. Correspondingly, four channel-specific signal-to-noise distance values would exemplarily be determined for each of the known data sequences, for example by determining four signal power values and four noise power values each per known data sequence.

Specific embodiments of the invention will be discussed below in greater detail. For reasons of simplicity and a clearer illustration, binary frequency-shift keying will be discussed at first. Discussions as to higher-value frequency-shift keying will follow later on.

Transmission by means of binary frequency-shift keying is assumed here. The signals $s_0(t)$ and $s_1(t)$ frequency-shift-keyed by the transmitter based on the logic values $d(t) \in \{0, 1\}$ to be transmitted are disturbed and attenuated on the transmission path due to the non-ideal transmission characteristics of a channel used, wherein the disturbance and attenuation characteristics of the transmission channel may generally differ for $s_0(t)$ and $s_1(t)$, the result for the signal arriving at the receiver being:

$$r(t)=|d(t)-1|\alpha_0 A \cos(2\pi f_0 t+\theta_0)+d(t)\alpha_1 A \cos(2\pi f_1 t+\theta_1)+n(t) \quad (4)$$

with generally differing attenuations $\alpha_0$ and $\alpha_1$, and the exemplary function n(t) of a generally frequency-selective disturbance process.

In the inventive method, the signal received r(t) is at first, as is also the case in conventional non-coherent receivers for binary frequency-shift keying (BFSK receivers), divided into two channels by means of band pass filters centered relative to the frequencies $f_0$ and $f_1$, respectively, the result being:

$$r_0(t)=|d(t)-1|\alpha_0 A \cos(2\pi f_0 t+\theta_0)+n_0(t) \quad (5)$$

and $$r_1(t)=d(t)\alpha_1 A \cos(2\pi f_1 t+\theta_1)+n_1(t) \quad (6)$$

with the exemplary functions $n_0(t)$ and $n_1(t)$ of two generally different disturbance processes. It is irrelevant here whether the frequencies $f_0$ and $f_1$ in the signals $r_0(t)$ and $r_1(t)$ are the frequencies emitted by the transmitter or the frequencies resulting from a mixture taking place in the receiver. In the time intervals where d(t)=0, the signal $r_1(t)$ includes only spurious portions. The signal $r_0(t)$, in contrast, is made up of spurious and useful portions. In the case of $d(t)=1$, this applies in analogy: $r_1(t)$ then includes disturbing or spurious and useful portions, $r_0(t)$ includes only spurious portions. The signals $r_0(t)$ and $r_1(t)$ bearing signs are then transferred to sign-less signals in an arithmetic unit, advantageously a discrete-time arithmetic unit, maybe by squaring. All considerations explained below assume a discrete-time arithmetic unit. However, by replacing the corresponding sigma signs by integrals in the formulae below, the method may also be applied to continuous-time systems. Furthermore, it is irrelevant where in the signal processing chain of the receiver the continuous-time receive signal is transferred to a discrete-time signal. When using discrete-time arithmetic units, a sufficient number of samples within a bit interval $T_b$ is to be ensured. When selecting the sequences in R, such are to be used advantageously which exhibit the smallest possible correlation maximums, i.e. are approximately orthogonal.

When referring to the sample rate as $1/T_S$, the discrete time-receive signals may be expressed as follows:

$$r_0[n]=r_0(nT_S) \quad (7)$$

and $$r_1[n]=r_1(nT_S) \quad (8)$$

with $n \in N_0$. The result is the expected value of the normalized signal power within a bit interval $T_b$ in both channels:

$$\mu_0 = E\{r_0^2[n]\} = \frac{1}{K}\sum_{n=0}^{K-1} r_0^2[n] \quad (9)$$

and $$\mu_1 = E\{r_1^2[n]\} = \frac{1}{K}\sum_{n=0}^{K-1} r_1^2[n], \quad (10)$$

with the number of samples per bit interval $K=T_b/T_S$, wherein, for reasons of simplicity, K is assumed to be an integer value, wherein in other embodiments K also takes non-integer values. When there is no useful signal in the channel of the frequency $f_0$ within a bit interval $T_b$, i.e. when the transmitter has transmitted the logic value of "1" (i.e., when in the bit interval $T_b$ the signal $s_1(t)=A\cos(2\pi f_1 t + \theta_1)$, whereas $s_0(t)=0$), $\mu_0$ is the expected value of the normalized noise power within this time interval. If, however, the transmitter has transmitted the logic value "0", $\mu_0$ will describe the expected value of the sum of signal and noise powers. The opposite is true for $\mu_1$.

Thus, an estimate value for the signal-to-noise ratio $\gamma$ for both channels may be determined for a known sequence $R_i$ of a length of $N_S$ bits, exemplarily by subtracting the expected value of the noise power from the expected value of the sum of signal and noise powers and then normalizing the result to the expected value of the noise power.

When referring to the expected value of the normalized signal power in the channel of the frequency $f_0$ over all the intervals where $R_i$ contains a logic "0", as $\mu_{SN0}$ and referring to the expected value of the normalized signal power in the channel of the frequency $f_0$ over all the intervals where $R_i$ contains a logic "1", as $\mu_{N0}$, the result for the estimate value of the signal-to-noise ratio in this channel will be:

$$\gamma_0 = \frac{\mu_{SN0} - \mu_{N0}}{\mu_{N0}}. \quad (11)$$

In analogy, the following results for the estimate value of the signal-to-noise ratio in the channel of the frequency $f_1$:

$$\gamma_1 = \frac{\mu_{SN1} - \mu_{N1}}{\mu_{N1}}, \quad (12)$$

with the expected value $\mu_{SN1}$ of the normalized signal power in the channel of the frequency $f_1$ over all the intervals where $R_i$ contains a logic "1", and with the expected value $\mu_{N1}$ of the normalized signal power in the channel of the frequency $f_1$ over all the intervals where $R_i$ contains a logic "0".

Determining the expected values, starting from a known sequence $R_i$ of a length of $N_S$ bits, with a number of samples per bit interval $K=T_b/T_S$ and the receive signals in both channels $r_0[n]$ and $r_1[n]$, may be expressed as follows:

$$\mu_{SN0} = \frac{1}{K\sum_{j=1}^{N_S} |R_{ij}-1|} \sum_{j=1}^{N_S} \sum_{n=(j-1)K}^{jK-1} r_0^2[n]|R_{ij}-1|, \quad (13)$$

$$\mu_{N0} = \frac{1}{K\sum_{j=1}^{N_S} R_{ij}} \sum_{j=1}^{N_S} \sum_{n=(j-1)K}^{jK-1} r_0^2[n]R_{ij}, \quad (14)$$

$$\mu_{SN1} = \frac{1}{K\sum_{j=1}^{N_S} R_{ij}} \sum_{j=1}^{N_S} \sum_{n=(j-1)K}^{jK-1} r_1^2[n]R_{ij}, \quad (15)$$

$$\mu_{N1} = \frac{1}{K\sum_{j=1}^{N_S} |R_{ij}-1|} \sum_{j=1}^{N_S} \sum_{n=(j-1)K}^{jK-1} r_1^2[n]|R_{ij}-1|. \quad (16)$$

For the known sequence $R_i$, $\mu_{SN0}$ is a first channel-specific signal power value, $\mu_{N0}$ is a first channel-specific noise value power ($\mu_{SN0}$ and $\mu_{N0}$ are each channel-specific to the channel with the frequency $f_0$), $\mu_{SN1}$ is a second channel-specific signal power value and $\mu_{N1}$ is a second channel-specific noise power value ($\mu_{SN1}$ and $\mu_{N1}$ are each channel-specific to the channel with the frequency $f_1$). When calculating $\gamma_0$ and $\gamma_1$ based thereon, for example, as in the formulae (11) and (12), $\gamma_0$ and $\gamma_1$ will be channel-specific signal-to-noise distance values.

A device or method in accordance with an embodiment will then determine the values $\gamma_0$ and $\gamma_1$ for all M sequences $R_i$, with $i=1, 2, \ldots, M$ present in a defined and known table R and subsequently decide for a sequence based on the maximum value of $\gamma_0$ or $\gamma_1$. Starting from the M reference sequences, M estimates of the signal-to-noise distance each are performed in both frequency channels. A specific reference sequence $R_i$ each for one of the total M estimates of the signal-to-noise distance is used as a basis for determining the intervals which are based on a logic value "0" or "1" in both channels. That reference sequence for which the estimate of the signal-to-noise distance in one of the two frequency channels results in the greatest value, may be assumed to be the sequence transmitted by the transmitter and, consequently, the correct sequence.

Starting with the signals $r_0[n]$ and $r_1[n]$ received and sampled in both channels, the estimate values of the signal-to-noise distance and:

$$\gamma_{0,i} = \frac{\left[\frac{1}{K\sum_{j=1}^{N_s}|R_{ij}-1|}\sum_{j=1}^{N_s}\sum_{n=(j-1)K}^{jK-1}r_0^2[n]|R_{ij}-1|\right] - \left[\frac{1}{K\sum_{j=1}^{N_s}R_{ij}}\sum_{j=1}^{N_s}\sum_{n=(j-1)K}^{jK-1}r_0^2[n]R_{ij}\right]}{\frac{1}{K\sum_{j=1}^{N_s}R_{ij}}\sum_{j=1}^{N_s}\sum_{n=(j-1)K}^{jK-1}r_0^2[n]R_{ij}} \quad (17)$$

$$\gamma_{1,i} = \frac{\left[\frac{1}{K\sum_{j=1}^{N_s}R_{ij}}\sum_{j=1}^{N_s}\sum_{n=(j-1)K}^{jK-1}r_1^2[n]R_{ij}\right] - \left[\frac{1}{K\sum_{j=1}^{N_s}|R_{ij}-1|}\sum_{j=1}^{N_s}\sum_{n=(j-1)K}^{jK-1}r_1^2[n]|R_{ij}-1|\right]}{\frac{1}{K\sum_{j=1}^{N_s}|R_{ij}-1|}\sum_{j=1}^{N_s}\sum_{n=(j-1)K}^{jK-1}r_1^2[n]|R_{ij}-1|} \quad (18)$$

are determined using the formulae (11) to (16) for all i=1, 2, ..., M sequences $R_i$ present in R. $\gamma_{0,i}$ and $\gamma_{1,i}$ in turn are channel-specific signal-to-noise distance values. Subsequently, the decision δ for a sequence $R_δ$ takes place in dependence on the maximum value of all $\gamma_{p,i}$ with p∈{0, 1}:

$$\delta = \arg\max_i\left(\max_p(\gamma_{p,i})\right), \quad (19)$$
$$i = 1, 2, \ldots, M,$$
$$p \in \{0, 1\}.$$

This is to say that, in order to make a decision, it is examined for each of the M pairs $\gamma_{0,i}$ and $\gamma_{1,i}$ for which of the two channels the estimate of the signal-to-noise distance takes higher a value, wherein the smaller value of $\gamma_{p,i}$ with p∈{0, 1} is dismissed. Subsequently, it is examined for which i the $\gamma_{p,i}$ now determined takes the maximum value. Finally, this is the decision δ of the receiver for one sequence $R_δ$ from R.

As far as a probability of correct decisions is concerned, the concept of embodiments presented here has significant advantages over conventional non-coherent FSK receivers with subsequently forming a correlation of the received sequence with the reference sequences, for both a transmission behavior of equal distribution over frequency and a transmission behavior which is not constant as a function of frequency. In contrast to coherent FSK receivers where a correlation is formed subsequently for sequence detection, the inventive concepts exhibit the advantage of being easier to realize on the one hand. On the other hand, the concepts in accordance with embodiments are of advantage with regard to the probability of correct decisions when the disturbance and attenuation characteristics differ in both frequency channels and these characteristics are not known to the receiver.

The inventive concepts are not restricted to the embodiments presented here. Rather, a plurality of implementation variations which make use of the solution presented, even with a basically different realization, are conceivable.

Figure 2:
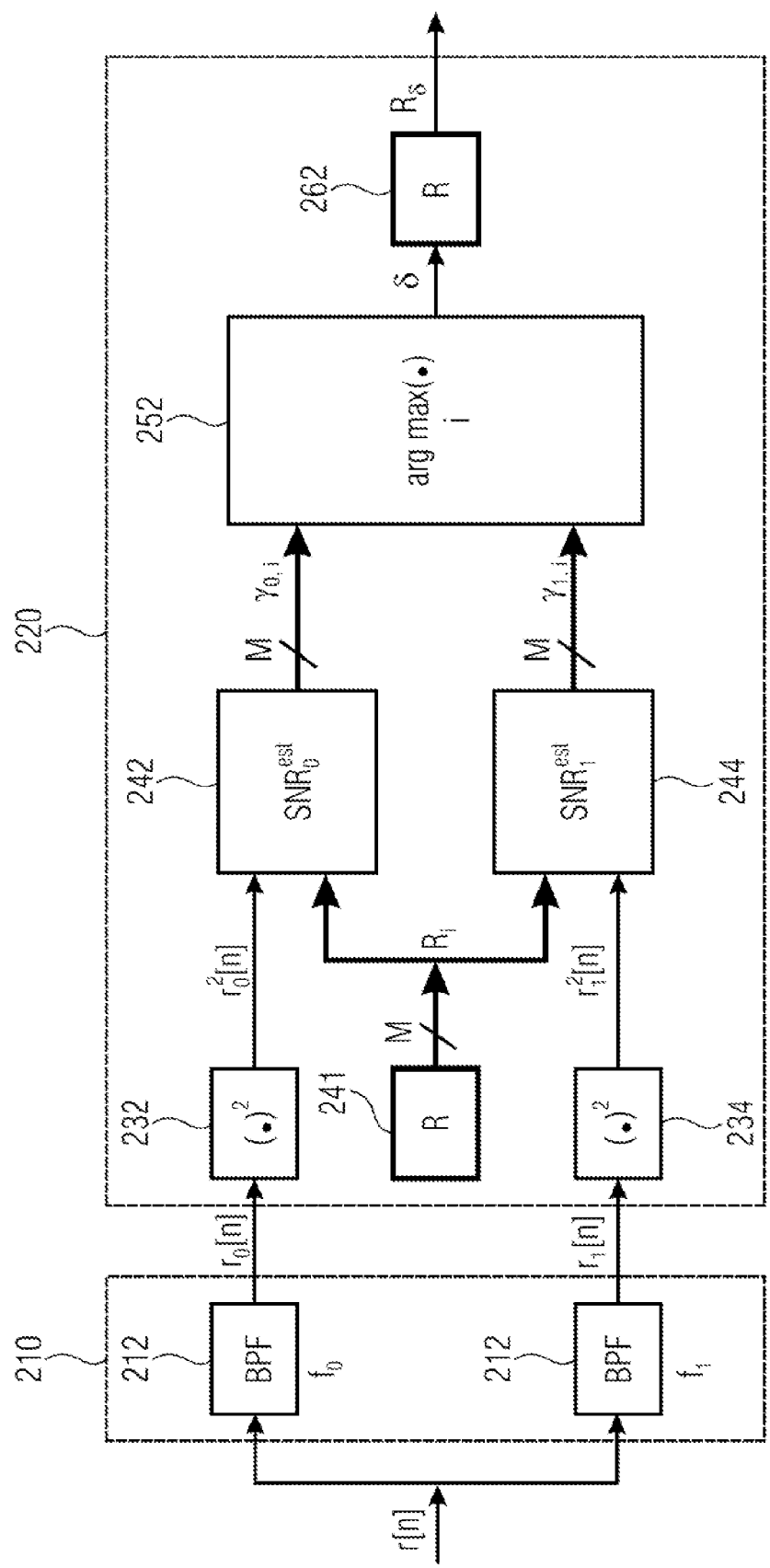
FIG. 2 shows a device for determining a data sequence encoded by a frequency-modulated input signal in accordance with another embodiment.

FIG. 2 shows a device for determining a data sequence encoded by a frequency-modulated input signal in accordance with another embodiment. Thus, temporal sampling of the receive signal taking place before the frequency separation of the two channels is assumed (not illustrated). Sampling may, however, also take place anywhere else within the signal processing chain or temporal sampling may be omitted, for example when using continuous-time arithmetic units. In addition, in the embodiment of FIG. 2, squaring of the signals $r_0$ and $r_1$ is assumed, which, however, may principally also be replaced by calculating an amount, for example. Finally, the inventive concepts may also be used when, unlike what is illustrated in the embodiment of FIG. 2, the received signal is subjected to amplification, attenuation and/or frequency conversion (mixing).

In FIG. 2, the input signal r[n] is at first divided into two signals $r_0[n]$ and $r_1[n]$ using the two band pass filters (BPF) centered to the frequencies $f_0$ and $f_1$. This may be done by filter elements 212, 214 of a filter unit 210. The filter unit 210 thus represents an exemplary implementation of the filter unit 110 in accordance with an embodiment. The result is a first frequency-filtered channel signal (subsignal) $r_0[n]$ with a first center frequency $f_0$ and a second frequency-filtered channel signal (subsignal) $r_1[n]$ with a second center frequency $f_1$.

Further processing of the first frequency-filtered channel signal $r_0[n]$ and the second frequency-filtered channel signal $r_1[n]$ is done in an evaluation unit 220 which represents an exemplary implementation of the evaluation unit 120 in accordance with an embodiment.

At first, the two channel signals (subsignals) are squared in two squaring units 232, 234 resulting in the signals $r_0^2[n]$ and $r_1^2[n]$ which represent a first squared channel signal ($r_0^2[n]$) and a second squared channel signal ($r_1^2[n]$).

After that, the signal-to-noise ratio (SNR) is estimated in accordance with equations (17) and (18) in the channel-specific signal-to-noise distance determining units $SNR_0^{est}$ 242 and $SNR_1^{est}$ 244 for each of the M reference sequences contained in the table R stored in the memory unit 241 (the known data sequences), which results in M estimate values $\gamma_{0,i}$ and $\gamma_{1,i}$ for each of the two frequency channels. In other words: channel-specific signal-to-noise distance values for each of the M known data sequences are determined by the signal-to-noise distance determining units 242, 244.

These estimate values (channel-specific signal-to-noise distance values) are then fed to an argmax unit 252 for determining the argument of the maximum value. The argmax unit 252 determines, from all 2M estimate values $\gamma_{0,i}$ and $\gamma_{1,i}$, the maximum value, i.e. a maximum signal-to-noise distance value, and outputs the argument i thereof (referred to by δ).

When the table R of the M reference sequences $R_i$ is indicated by δ, the result for a data sequence determining unit 262 is that sequence $R_δ$ as the determined data sequence which has been determined by the inventive concepts starting from the receive signal r[n]. The data sequence determining unit 262 thus selects that known data sequence of the set of known data sequences as the determined data sequence to which is associated the maximum signal-to-noise distance value.

Considerations and explanations as to the mode of functioning of the inventive concepts will be illustrated below. A sequence length $N_s$ of four bits is assumed here. Both this sequence length and the bit sequences of the reference sequences selected for the following example are purely arbitrary and are only of exemplary character. The inventive concepts may basically also be applied to sequences of any length and any bit sequences. However, it seems to be practical to use such sequences which are approximately orthogonal relative to one another. Furthermore, the frequencies $f_0$, $f_1$ and the bit durations $T_b$ and the ratio of $f_0$ and $f_1$ relative to $T_b$ selected here are arbitrary and of exemplary character.

Figure 3:
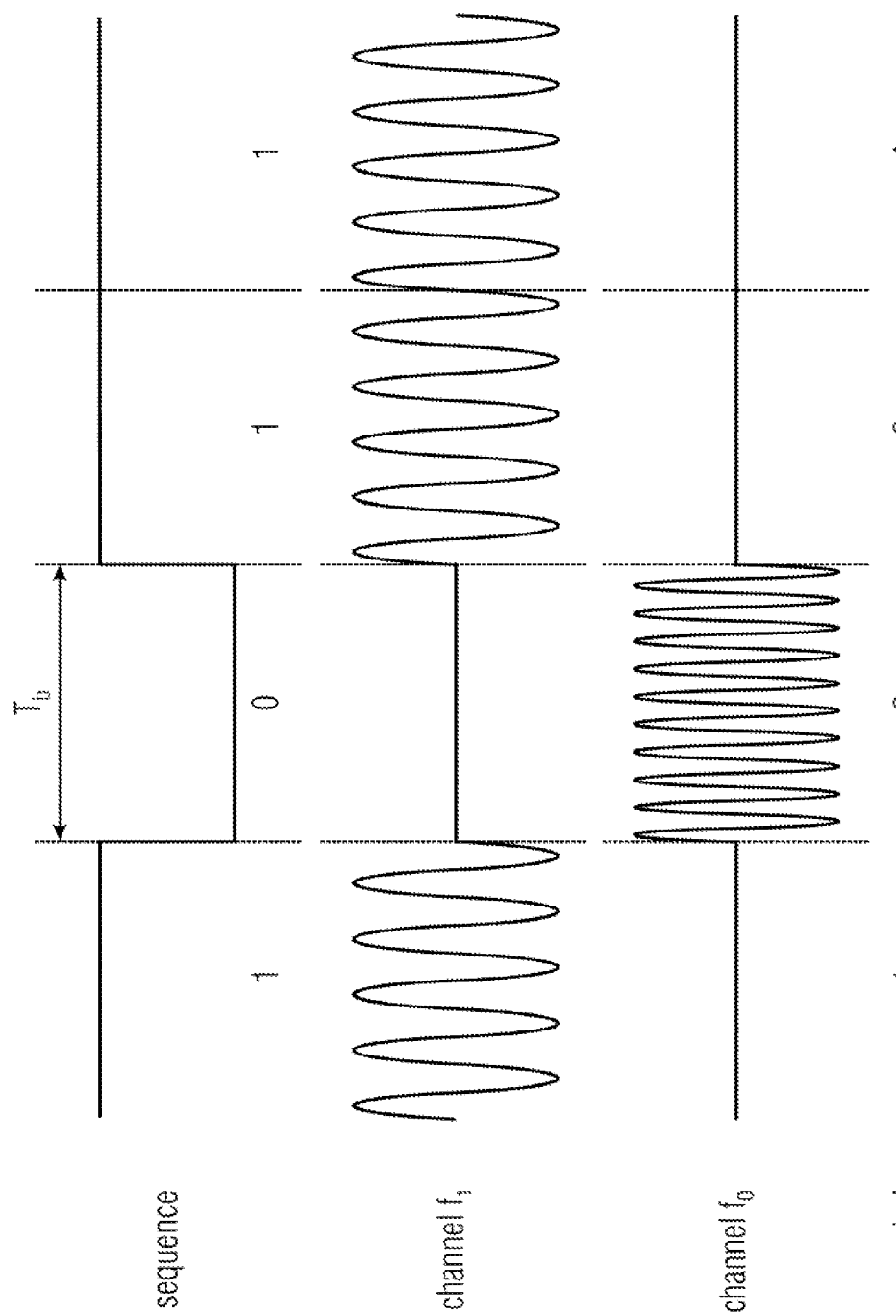
FIG. 3 shows two frequency-filtered channel signals in accordance with an embodiment.

FIG. 3 shows the two frequency-filtered channel signals in accordance with an embodiment. An input signal frequency-modulated by a modulation rule is assumed again. In accordance with said modulation rule, as has already been described, a sinusoidal signal of the frequency $f_0$ is, for example, emitted by the transmitter in the case of a data value "0" in the encoded data sequence, or a sinusoidal signal of the frequency $f_1$ is emitted in the case of a data value (logic value) "1". $f_0$ here may be considered to be a first encoding frequency; $f_1$ may be considered to be a second encoding frequency. Thus, $f_0$ and $f_1$ comprise different values: $f_0 \neq f_1$. In the case of a logic value of "0", a signal:

$$s_0(t) = A\cos(2\pi f_0 t + \theta_0)$$

is emitted by the transmitter for a duration $T_b$, in the case of a logic "1", however, the signal $$s_1(t) = A\cos(2\pi f_1 t + \theta_1)$$

with phase positions of the two signals $\theta_0$ and $\theta_1$ which are generally different, and an amplitude A is emitted.

A binary frequency-shift-keyed sequence with the bit sequence S="1011" is considered at first. This binary frequency-shift-keyed sequence consists of the signal in the channel $f_0$ (signal $r_0(t)$ or $r_0[n]$) and the channel $f_1$ ($r_1(t)$ or $r_1[n]$).

For the sake of simplification, the entire time interval illustrated is divided into four periods, each having a duration of a bit interval $T_b$.

The device or method in accordance with an embodiment will then try, starting with the signals in the two frequency channels, to recognize the sequence S (here "1011") emitted by the transmitter from a finite number of known sequences. The device/method here calculates estimates of the signal-to-noise distance using all the reference sequences known to it.

At first, it is assumed that the first sequence $R_i$ available for the receiver in the table R, with i=1, is the sequence $R_1$="1011". In the channel $f_0$, the device/method calculates the expected value of the signal power of the signal received over periods 1, 3 and 4 (those periods for which there is a logic "1" in $R_i$) and considers the result to be "noise". Correspondingly, the inventive device/method also calculates the expected value of the signal power over period 3 (that period for which there is a logic "0" in $R_1$) and considers this result to be "signal+noise". Starting from the sequence assumed, the inventive device/method determines an estimate of the signal-to-noise distance in the channel $f_0$ in correspondence with formulae (17) to be:

$$\gamma_{0,1} = \frac{\text{"signal + noise"} - \text{"noise"}}{\text{"noise"}}.$$

In analogy, for the channel $f_1$, the expected value of the signal power over those periods where there is a logic "1" in $R_1$ is considered to be "signal+noise", whereas the expected value of the signal power over those periods where $R_1$ has a logic "0" is considered to be "noise". In accordance with formula (18), this results in the estimate of the signal-to-noise distance $\gamma_{1,1}$ in the channel $f_1$, starting from the sequence $R_1$.

After that, the inventive device/method performs the same operations using the second sequence $R_i$ with i=2 from the table R. It is assumed that $R_2$="0111". For the channel $f_1$, the inventive device/method forms the expected value of the signal power in period 1 and considers the signal to be "noise". However, in correspondence with the drawing, in period 1 in channel $f_1$, in reality this is the power of signal and noise portions, which is why the noise portion determined by the inventive method is estimated to be too great. Correspondingly, the expected value of the signal power over periods 2, 3 and 4 is determined and interpreted to be "signal+noise". In period 2, only noise power is present, which is why "signal+noise" is estimated to be too small. Subsequently, the estimate value for the signal-to-noise distance in channel $f_1$ is determined again, now starting with the sequence $R_2$:

$$\gamma_{1,2} = \frac{\text{"signal + noise"} - \text{"noise"}}{\text{"noise"}}.$$

Since "signal+noise" is estimated to be too small and "noise" estimated to be too great, a smaller value results for $\gamma_{1,2}$ than for $\gamma_{1,1}$. It is apparent that, due to the corresponding proceedings, the estimate of the signal-to-noise distance $\gamma_{0,2}$, starting from the reference sequence $R_2$, in the channel $f_0$ is smaller than the estimate of the signal-to-noise distance $\gamma_{0,1}$, starting from the reference sequence $R_1$.

This procedure is performed for all of the M reference sequences $R_i$ of the table R, which results in M values $\gamma_{0,i}$ and $\gamma_{1,i}$ each.

It becomes obvious from the above explanations that, among all $\gamma_{0,i}$, that estimate value will be the greatest which is based on the reference sequence $R_i$ from R which coincides with the sequence S emitted by the transmitter. The same applies for $\gamma_{1,i}$.

Let $\gamma_{0,m}$ be the maximum value of all M values $\gamma_{0,i}$ and $\gamma_{1,n}$ be the maximum value of all M values $\gamma_{1,i}$. Taking this as a starting position, the two values $\gamma_{0,m}$ and $\gamma_{1,n}$ are compared and only the greater one of the two values is used for making a decision. Let $\gamma_{0,m}$ be greater than $\gamma_{1,n}$, then the inventive method will decide for the m-th sequence $R_m$ from the table R. Here, m is a number between 1 and M and results from that reference sequence for which the estimate of the signal-to-noise distance is maximum. If, however, $\gamma_{1,n}$ is greater than $\gamma_{0,m}$, then the n-th sequence from R is decided for. By dismissing the smaller value among $\gamma_{o,m}$ and $\gamma_{1,n}$, only that of the two frequency channels available will be considered which exhibits a higher signal-to-noise ratio and thus will result in a more reliable decision. This procedure will be of particular advantage when the spurious and attenuation characteristics differ for the channels $f_0$ and $f_1$. It is explicitly pointed out here again that the receiver does not need to know the transmission characteristics.

Basically, the devices or methods of sequence detection are suitable for addressing certain receivers in a network.

Figure 4:
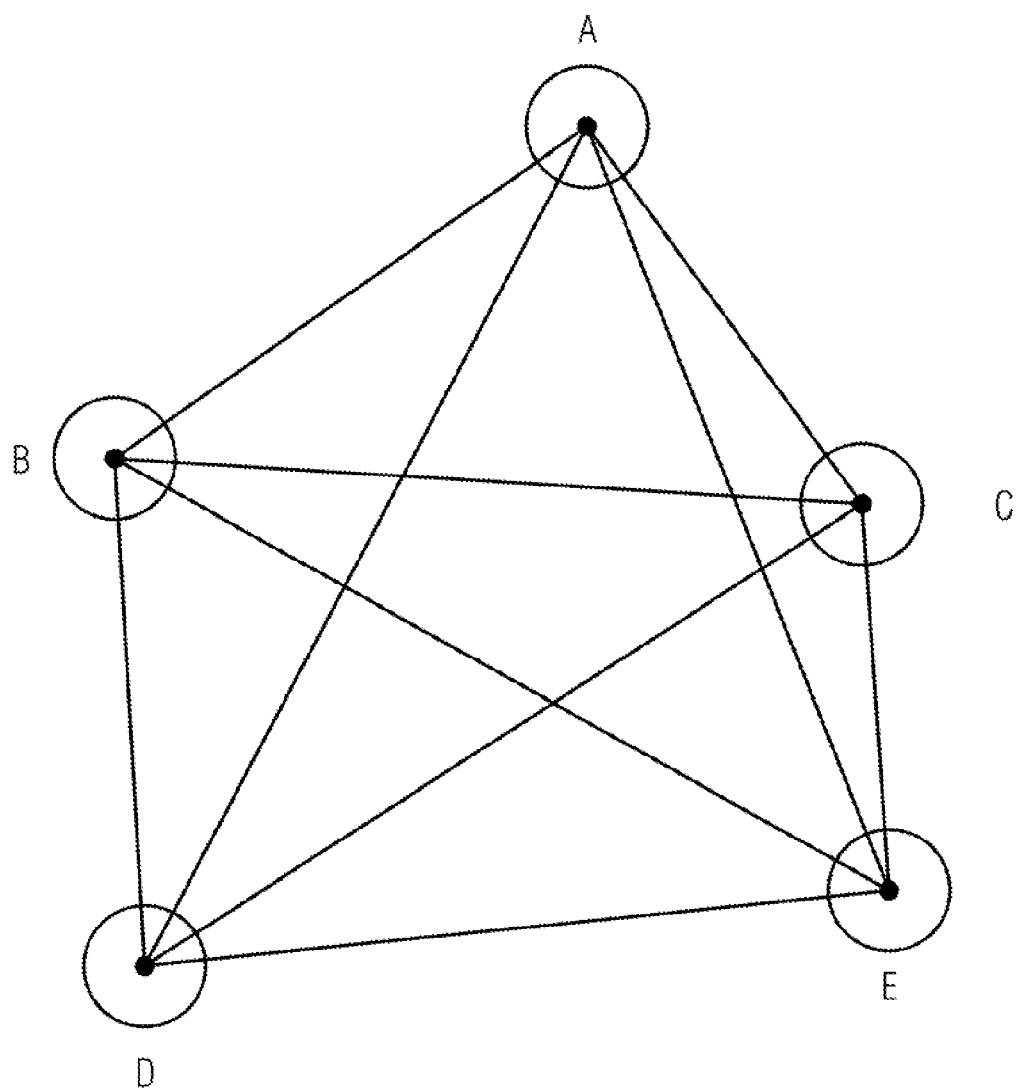
FIG. 4 shows an embodiment in which a network having 5 communication nodes which share the same medium of transmission is illustrated.

FIG. 4 shows an embodiment wherein a network having 5 communication nodes which share the same transmission medium is illustrated.

Each of the communication nodes in FIG. 4 is equipped with a transceiver and is thus able to exchange data with the other nodes. Each node is provided with an address $R_i$ unique in this network, with i=1, 2, . . . , M (M being the maximum number of nodes present in a network). Each of the nodes knows its own address and the addresses of all the other nodes in the network. This information is stored in the nodes in a table R with the addresses of all the nodes. When, for example, node A wants to send data to node D, node A has to address node D. For this, node A at first emits the address of node D, here referred to as $R_D$. By means of the transmission medium, the message with the address $R_D$ reaches all of the nodes in the network. Transmitting address data takes place by means of frequency-shift keying (binary frequency-shift keying is assumed here again).

In accordance with the inventive device/method, each node in the network calculates the estimates of the signal-to-noise distance, starting from the signal received for the two frequency channels $f_0$ and $f_1$, and using the reference sequences (or addresses) stored in the table R and recognizes the sequence (or address) transmitted by the transmitter using the maximum estimate of the signal-to-noise distance, corresponding to formula (19). When the sequence recognized in a receive node equals the address having been allocated to this node, this node is considered to be addressed and may then be provided with information data. All of the other nodes find out that the address transmitted by the receiver corresponds to the address of another node and will thus ignore the data transmitted subsequently. In the present example, node D recognizes that the sequence transmitted by the transmitter is $R_D$. Thus, node D has been addressed successfully. All of the other nodes will also recognize the sequence $R_D$ transmitted by the transmitter. Since, however, other addresses $R_i \neq R_D$ were allocated to these nodes, these nodes are considered not to be addressed by the sequence $R_D$.

In contrast to conventional addressing methods, the inventive method has the advantageous characteristic that addressing or sequence detection still works with high probability even when one of the two frequency channels is disturbed severely, but the other one only moderately.

Figure 5:
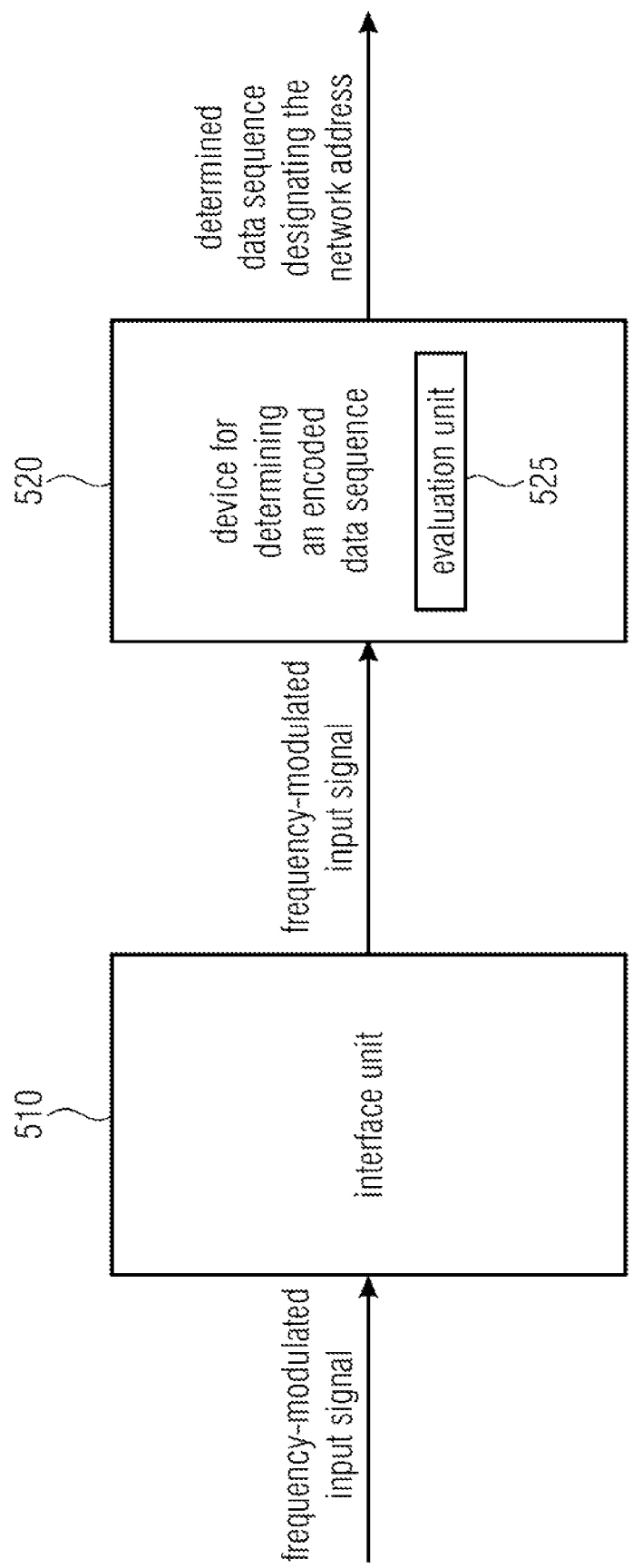
FIG. 5 shows a device for recognizing a network address encoded by a frequency-modulated input signal in accordance with an embodiment.

FIG. 5 shows a device for recognizing a network address which is encoded by a frequency-modulated input signal in accordance with an embodiment. The device includes an interface unit 510 for receiving the frequency-modulated input signal. In addition, the device for recognizing a network address comprises a device 520 in accordance with one of the embodiments described above for determining a data sequence encoded by the frequency-modulated input signal which includes a plurality of data elements, the encoded data sequence designating a network address, the evaluation unit 525 of the device 520 in accordance with one of the embodiments described above being configured to determine a data sequence signal-to-noise distance value for each known data sequence of a set of known data sequences, each known data sequence of the set of known data sequences designating a network address each.

The inventive device/method will be of particular advantage when being used for addressing an SFSK-receiver [2]. In an SFSK receiver, the data from the received signal which is subjected to binary frequency-shift keying is demodulated by allocating, when making the decision, more weight to the signal in the channel $f_0$ or $f_1$, depending on the transmission characteristics. If the channel $f_0$ is disturbed more severely than the channel $f_1$, the signal $r_1$ present in the channel $f_1$ is weighted stronger than $r_0$ for making a decision whether the logic value on which the receive signal is based is a "0" or "1". Since an SFSK receiver needs to know the transmission characteristics, in this method known data sequences are transmitted, before transmitting useful data, using which the receiver may derive the transmission characteristics. Trans-mitting known data sequences here limits the useful data rate and results in additional expenditure. However, if an SFSK receiver is used in connection with the inventive device or the inventive method, this additional expenditure is dropped since the information, necessitated by the SFSK receiver, on the channel characteristics result implicitly from the calculations of the inventive device or inventive method and may thus be passed on to the SFSK receiver.

Figure 6:
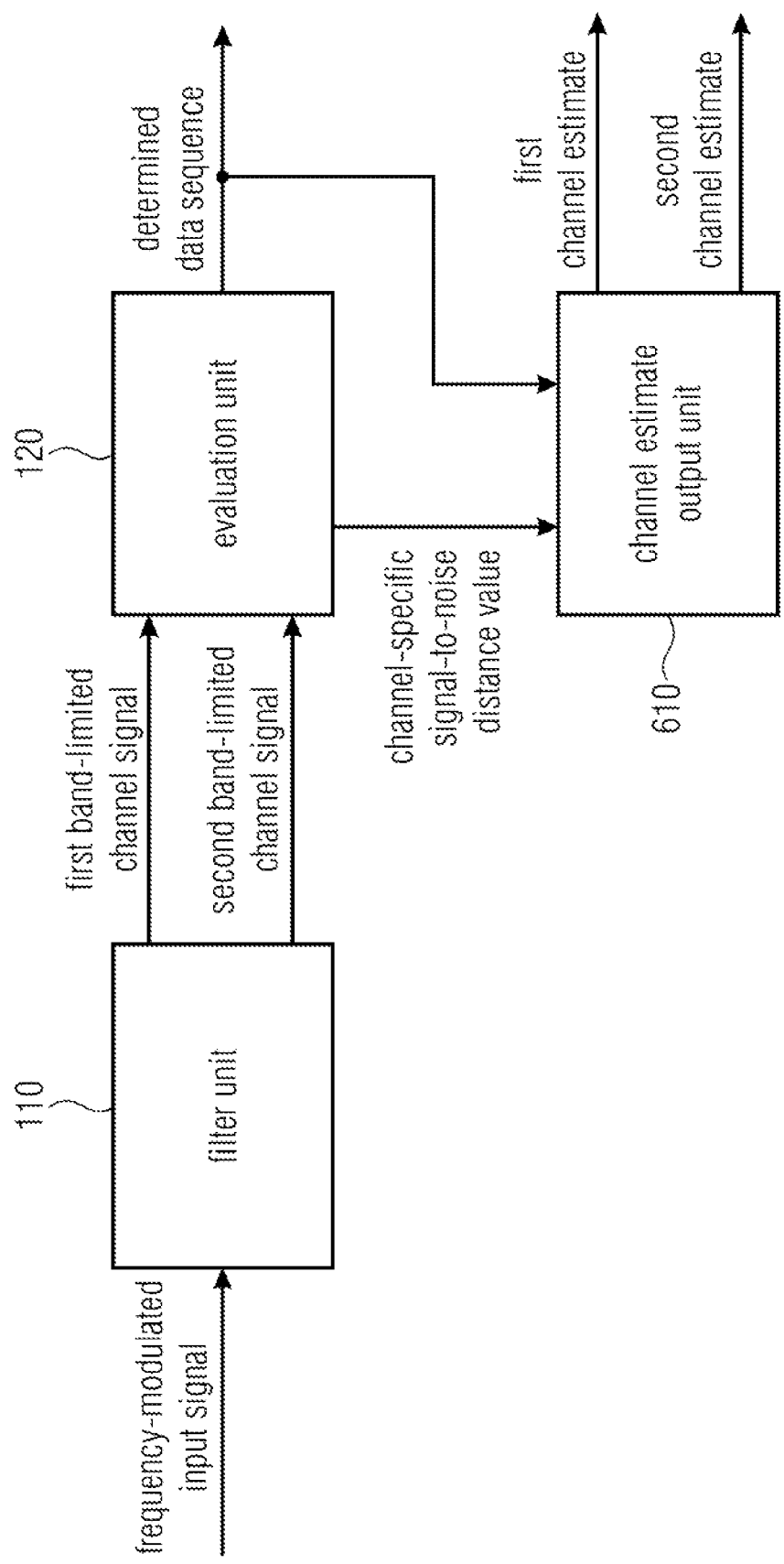
FIG. 6 shows a device for determining a data sequence encoded by a frequency-modulated input signal comprising a channel estimate output unit in accordance with an embodiment.

FIG. 6 shows a device for determining a data sequence encoded by a frequency-modulated input signal in accordance with one of the embodiments described above, additionally comprising a channel estimate output unit 610. The channel estimate output unit 610 is configured to output the first channel-specific signal-to-noise distance value of the determined data sequence as a first channel estimate of a first channel. Additionally, the channel estimate output unit 610 is configured to output the second channel-specific signal-to-noise distance value of the determined data sequence as a second channel estimate of a second channel. Here, the channel estimate output unit 610 may obtain from the evaluation unit 120 information on the determined data sequence and the channel-specific signal-to-noise distance values. The first channel estimate of the first channel and the second channel estimate of the second channel may then be used by an SFSK receiver which in turn does not need to determine the channel estimates itself but may resort to the channel estimate of the device of FIG. 6. When the filter unit 110 generates more than two channel signals, a third or further channel estimate for the third and every further channel may be output by the channel estimate output unit 610 using the same concepts as for two channels.

An extension for higher-value frequency-shift keying will be provided below. As has already been discussed, the concepts described above may also be applied to higher-value frequency-shift keying (so-called m-FSK). With frequency-shift keying with a significance m, $\log_2 m$ logic values (exemplarily bits) are summarized in the transmitter to form symbols, the result being m different symbols $S_0$ to $S_{m-1}$ which are subsequently converted by the transmitter to m different transmitting frequencies $f_0$ to $f_{m-1}$, as is exemplarily described in [1].

Here, m is a power of 2: $m=2^N$ with $N \in \mathbb{N}$. Mapping the logic values to symbols is performed in accordance with a certain mapping rule. Such a mapping rule may, in the case of 4-FSK, exemplarily be that a bit sequence "00" is described by the symbol $S_0$ and thus transmitted as a signal in the channel of the frequency $f_0$. Transmitter and receiver use the same mapping rule. In the receiver, the receive signal r(t) or its discrete-time counterpart r[n] is divided into m subsignals $r_0(t)$ to $r_{m-1}(t)$ or $r_0[n]$ to $r_{m-1}[n]$ not overlapping in the frequency range by means of m band pass filters centered to the frequencies $f_0$ to $f_{m-1}$. This means that, at any given time, apart from the noise portion, a useful signal in the form of a sine signal will only be present in one of the m channels, whereas all the other channels comprise only noise.

With binary frequency-shift keying described above, m=2, wherein a data value (exemplarily a logic value) "0" is associated to the symbol $S_0$ and a data value (exemplarily a logic value) "1" is associated to the symbol $S_1$. Thus, transmitting a logic value "0" is done by a sine signal in the channel $f_0$ and a logic value "1" by a sine signal in the channel $f_1$.

When using higher-value frequency-shift keying (m>2) for transmitter modulation of the logic values, the inventive method of sequence detection may be used by adjusting formulae (5) to (19) correspondingly:

In analogy with formulae (5) and (6), the receive signal in the p-th frequency channel (i.e. in the channel centered to the frequency $f_p$) may be described as a function of time as follows:

$$r_p(t) = S_x \alpha_p A \cos(2\pi f_p t + \theta_p) + n_p(t), \quad p = 0, 1, \ldots, m-1. \quad (20)$$

Thus, $S_x = 1$ when a symbol which is associated to the frequency channel $f_p$ has been transmitted by the transmitter, i.e. when x=p, otherwise $S_x=0$. $\alpha_p$ describes attenuation and $n_p(t)$ the exemplary function of a noise process in the p-th frequency channel.

Using the same ideas as when deriving formulae (17) and (18) for estimating the signal-to-noise distance in both channels in the case of binary frequency-shift keying, the following results for the estimate value of the signal-to-noise distance $\gamma_{p,i}$ in the p-th channel on the basis of the reference sequence $R_i$ used in the case of higher-value frequency-shift keying:

$$\gamma_{p,i} = \frac{\left[\frac{1}{K\sum_{j=1}^{N_s} P_{ij}} \sum_{j=1}^{N_s} \sum_{n=(j-1)K}^{jK-1} r_p^2[n] P_{ij}\right] - \left[\frac{1}{K\sum_{j=1}^{N_s} |P_{ij}-1|} \sum_{j=1}^{N_s} \sum_{n=(j-1)K}^{jK-1} r_p^2[n]|P_{ij}-1|\right]}{\frac{1}{K\sum_{j=1}^{N_s} |P_{ij}-1|} \sum_{j=1}^{N_s} \sum_{n=(j-1)K}^{jK-1} r_p^2[n]|P_{ij}-1|}, \quad (21)$$

with p=0, 1, . . . , m−1 and i=1, 2, . . . , M. $K=T_{symb}/T_S$ here describes the number of samples per symbol interval $T_{symb}$. The following applies for $P_{ij}$:

$$P_{ij} = \begin{cases} 1 & \text{if } R_{ij} = S_p, \\ 0 & \text{otherwise.} \end{cases} \quad (22)$$

R here is the table with the M reference sequences $R_i$ the elements $R_{ij}$ of which represent the symbols resulting from corresponding bit values by the mapping rule. $N_S$ is the number of symbols in a reference sequence. $P_{ij}$ thus takes the value 1 when the j-th element of the reference sequence $R_i$ of the table R corresponds to the symbol $S_p$, i.e. when it is assumed that, at the time considered, there is a useful signal in the p-th channel. If, on the other hand, $R_{ij}$ unequal to $S_p$, it is assumed that, at the time considered, there is only noise in the p-th channel and $P_{ij}$ enters into formula (21) with a value of 0.

Finally, in analogy to formula (19), the decision $\delta$ for a sequence $R_\delta$ takes place in dependence on the maximum value of all $\gamma_{p,i}$ resulting in:

$$\delta = \arg \max_i \left( \max_p (\gamma_{p,i}) \right), \quad (23)$$

$$i = 1, 2, \ldots, M,$$

$$p = 0, 1, \ldots, m-1.$$

Although some aspects have been described in connection with a device, it is to be understood that these aspects also represent a description of the corresponding method such that a block or element of a device is to be understood to be a corresponding method step or a feature of a method step.

In analogy, aspects having been described in connection with or as a method step, also represent a description of a corresponding block or detail or feature of a corresponding device. Some or all of the method steps may be performed by a hardware apparatus (or using a hardware apparatus), such as, for example, a microprocessor, a programmable computer or an electronic circuit. In some embodiments, some or several of the most important method steps may be executed by such an apparatus.

Depending on the implementation requirements, embodiments of the invention may be implemented in either hardware or software. The implementation may be done using a digital storage medium, exemplarily a floppy disk, DVD, Blu-ray disc, CD, ROM, PROM, EPROM, EEPROM or FLASH memory, hard disk drive or any other magnetic or optical storage onto which are stored electronically readable control signals which may cooperate or cooperate with a programmable computer system such that the respective method will be executed. This means that the digital storage medium may be computer-readable.

Some embodiments in accordance with the invention thus comprise a data carrier comprising electronically readable control signals which are able to cooperate with a programmable computer system such that one of the methods described herein will be performed.

Generally, embodiments of the present invention may be implemented as a computer program product comprising program code, the program code being operative to perform one of the methods when the computer program product runs on a computer.

The program code may exemplarily be stored on a machine-readable carrier.

Other embodiments comprise the computer program for performing one of the methods described herein, the computer program being stored on a machine-readable carrier. In other words, an embodiment of the inventive method is a computer program comprising program code for performing one of the methods described herein when the computer program runs on a computer.

Thus, another embodiment of the inventive method is a data carrier (or a digital storage medium or a computer-readable medium) onto which is recorded the computer program for performing one of the methods described herein.

Another embodiment of the inventive method is a data stream or sequence of signals illustrating the computer program for performing one of the methods described herein. The data stream or sequence of signals may exemplarily be configured to be transferred via a data communications link, exemplarily via the Internet.

Another embodiment comprises processing means, for example a computer or programmable logic element, which is configured or adapted to perform one of the methods described herein.

Another embodiment comprises a computer onto which is installed the computer program for performing one of the methods described herein.

Another embodiment in accordance with the invention comprises a device or system configured to transmit a computer program for performing at least one of the methods described herein to a receiver. Transmission may exemplarily take place electronically or optically. The receiver may exemplarily be a computer, mobile device, storage device or similar device. The device or system may exemplarily comprise a file server for transmitting the computer program to the receiver.

In some embodiments, a programmable logic device (exemplarily a field-programmable gate array, FPGA) may be used to perform some or all the functionalities of the methods described herein. In some embodiments, a field-programmable gate array may cooperate with a microprocessor to perform one of the methods described herein. Generally, in some embodiments, the methods are performed on the part of any hardware device. This may be universally employable hardware, like a computer processor (CPU), or hardware specific to the method, like, for example, an ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] F. Xiong, *Digital Modulation Techniques*, Artech House, Inc., second edition, 2006.
[2] T. Schaub, *Spread Frequency Shift Keying*, IEEE Transactions on communications, February 1994, edition 42, no. 234, pp. 1056-1064.

The invention claimed is:

1. A device for determining an encoded data sequence as a determined data sequence, the encoded data sequence being encoded by an input signal frequency-modulated in accordance with a modulation rule, the encoded data sequence comprising a plurality of data elements, comprising:
   a filter unit for filtering the frequency-modulated input signal in order to acquire a first frequency-filtered channel signal and a second frequency-filtered channel signal,
   an evaluation unit configured to associate two channel-specific signal-to-noise distance values to each data sequence of a set of known data sequences,
   wherein the evaluation unit is configured to determine, for each data sequence of the set of known data sequences, a first channel-specific signal-to-noise distance value of the two channel-specific signal-to-noise distance values based on said data sequence and based on the first frequency-filtered channel signal, and wherein the evaluation unit is configured to associate said first channel-specific signal-to-noise distance value of the two-channel-specific distance values to said data sequence,
   wherein the evaluation unit is configured to determine, for each data sequence of the set of known data sequences, a second channel-specific signal-to-noise distance value of the two channel-specific signal-to-noise distance values based on said data sequence and based on the second frequency-filtered channel signal, and wherein the evaluation unit is configured to associate said second channel-specific signal-to-noise distance value of the two-channel-specific distance values to said data sequence, and
   wherein the evaluation unit is configured to select from the set of known data sequences a data sequence as the determined data sequence that has an associated channel-specific signal-to-noise distance value which is greater than another channel-specific signal-to-noise distance value associated to another one of the known data sequences.

2. The device in accordance with claim 1, wherein the evaluation unit is configured to select one of the known data sequences as the determined data sequence that has an associated channel-specific signal-to-noise distance value which is greater than any other channel-specific signal-to-noise distance value associated to another one of the known data sequences of the set of known data sequences.

3. The device in accordance with claim 1,
   wherein the filter unit for filtering the frequency-modulated input signal is configured to acquire the first frequency-filtered channel signal with a first center frequency and the second frequency-filtered channel signal with a second center frequency,
   wherein the filter unit is implemented such that a frequency portion of the first center frequency in the second frequency-filtered channel signal is zero or smaller than a frequency portion of the first center frequency in the first frequency-modulated channel signal, and
   wherein the filter unit is implemented such that a frequency portion of the second center frequency in the first frequency-filtered channel signal is zero or smaller than a frequency portion of the second center frequency in the second frequency-modulated channel signal.

4. The device in accordance with claim 1,
   wherein the evaluation unit is configured to determine a set of channel-specific signal-to-noise distance values for each data sequence of the set of known data sequences, wherein said set of channel-specific signal-to-noise distance values comprises the first channel-specific signal-to-noise distance value of said data sequence of the set of known data sequences, and comprises the second channel-specific signal-to-noise distance value of said data sequence of the set of known data sequences,
   wherein the evaluation unit is configured to select from the set of channel-specific signal-to-noise distance values of each data sequence of the set of known data sequences, a greatest channel-specific signal-to-noise distance value as a data sequence signal-to-noise distance value of said data sequence of the set of known data sequences such that no other one of the channel-specific signal-to-noise distance values from the set of channel-specific signal-to-noise distance values of said data sequence of the set of known data sequences is greater, and
   wherein the evaluation unit is additionally configured to select that data sequence from the set of known data sequences as the determined data sequence such that there is no other data sequence from the set of known data sequences which has a signal-to-noise distance value being greater than the data sequence signal-to-noise distance value of the determined data sequence.

5. The device in accordance with claim 1,
   wherein the evaluation unit is configured to determine a first signal power value for each data sequence of the set of known data sequences depending on said data sequence of the set of known data sequences and depending on the first frequency-filtered channel signal,
   wherein the evaluation unit is configured to determine the first channel-specific signal-to-noise distance value of each data sequence of the set of known data sequences depending on the first signal power value of said data sequence of the set of known data sequences, wherein the evaluation unit is configured to determine a second signal power value for each data sequence of the set of known data sequences depending on said data sequence of the set of known data sequences and depending on the second frequency-filtered channel signal, and wherein the evaluation unit is configured to determine the second channel-specific signal-to-noise distance value of each data sequence of the set of known data sequences depending on the second signal power value of said data sequence of the set of known data sequences.

6. The device in accordance with claim 5, wherein the evaluation unit is configured to determine a first noise power value for each data sequence of the set of known data sequences depending on said data sequence of the set of known data sequences and depending on the first frequency-filtered channel signal, wherein the evaluation unit is configured to determine the first channel-specific signal-to-noise distance value of said data sequence of the set of known data sequences depending on the first signal power value of said data sequence of the set of known data sequences and depending on the first noise power value of said data sequence of the set of known data sequences such that the first channel-specific signal-to-noise distance value of said data sequence of the set of known data sequences indicates a size ratio of the first signal power value of said data sequence of the set of known data sequences relative to the first noise power value of said data sequence of the set of known data sequences, wherein the evaluation unit is configured to determine a second noise power value for each data sequence of the set of known data sequences depending on said data sequence of the set of known data sequences and depending on the second frequency-filtered channel signal, wherein the evaluation unit is configured to determine the second channel-specific signal-to-noise distance value of said data sequence of the set of known data sequences depending on the second signal power value of said data sequence of the set of known data sequences and depending on the second noise power value of said data sequence of the set of known data sequences such that the second channel-specific signal-to-noise distance value of said data sequence of the set of known data sequences indicates a size ratio of the second signal power value of said data sequence of the set of known data sequences relative to the second noise power value of said data sequence of the set of known data sequences.

7. The device in accordance with claim 6, wherein the filter unit comprises a first filter element with a first pass region for filtering the frequency-modulated input signal in order to acquire the first frequency-filtered channel signal, wherein the evaluation unit is configured to determine the first signal power value of each data sequence of the set of known data sequences depending on a first group of first signal portions of the first channel signal, the first group of first signal portions comprising only such signal portions of the first channel signal for which said data sequence of the set of known data sequences indicates that a first data value of the encoded data sequence is encoded by these signal portions, in case the frequency-modulated input signal encodes said data sequence of the set of known data sequences, the first data value being encoded by signal portions which comprise frequency portions corresponding to a first encoding frequency, wherein the first filter element is implemented such that the first encoding frequency is in the pass region of the first filter element, and wherein the evaluation unit is configured to determine the first noise power value of each data sequence of the set of known data sequences depending on a third group of third signal portions of the first channel signal, the third group of third signal portions comprising only such signal portions of the first channel signal for which said data sequence of the set of known data sequences indicates that the first data value of the encoded data sequence is not encoded by these signal portions, in case the frequency-modulated input signal encodes said data sequence of the set of known data sequences.

8. The device in accordance with claim 7, wherein the filter unit comprises a second filter element with a second pass region, different from the first pass region, for filtering the frequency-modulated input signal in order to acquire the second frequency-filtered channel signal, wherein the evaluation unit is configured to determine, the second signal power value of each known data sequence of the set of known data sequences depending on a second group of second signal portions of the second channel signal, the second group of second signal portions comprising only such signal portions of the second channel signal for which said data sequence of the set of known data sequences indicates that a second data value of the encoded data sequence is encoded by these signal portions, in case the frequency-modulated input signal encodes said data sequence of the set of known data sequences, the second data value being encoded by signal portions which comprise frequency portions corresponding to a second encoding frequency, wherein the second filter element is configured such that the second encoding frequency is in the pass region of the second filter element, the second filter element being implemented such that the first encoding frequency is not in the pass region of the second filter element, the first filter element being implemented such that the second encoding frequency is not in the pass region of the first filter element, and wherein the evaluation unit is configured to determine the second noise power value of each data sequence of the set of known data sequences depending on a fourth group of fourth signal portions of the second channel signal, the fourth group of fourth signal portions comprising only such signal portions of the second channel signal for which said data sequence of the set of known data sequences indicates that the second data value of the encoded data sequence is not encoded by these signal portions, in case the frequency-modulated input signal encodes said data sequence of the set of known data sequences.

9. The device in accordance with claim 6, wherein the evaluation unit is configured to calculate the first channel-specific signal-to-noise distance value of each data sequence of the set of known data sequences by calculating:

$$\frac{\mu_{SN0} - \mu_{N0}}{\mu_{N0}}$$

or by calculating:

$$\frac{\mu_{SN0}}{\mu_{N0}}$$

wherein $\mu_{SN0}$ refers to the first signal power value of said data sequence of the set of known data sequences, and
wherein $\mu_{N0}$ refers to the first noise power value of said data sequence of the set of known data sequences.

10. The device in accordance with claim 6,
wherein the evaluation unit is configured to calculate the second channel-specific signal-to-noise distance value of each data sequence of the set of known data sequences by calculating:

$$\frac{\mu_{SN1} - \mu_{N1}}{\mu_{N1}}$$

or by calculating:

$$\frac{\mu_{SN1}}{\mu_{N1}}$$

wherein $\mu_{SN1}$ refers to the second signal power value of said data sequence of the set of known data sequences, and
wherein $\mu_{N1}$ refers to the second noise power value of said data sequence of the set of known data sequences.

11. The device in accordance with claim 6,
wherein the evaluation unit is configured to calculate the first signal power value of each data sequence of the set of known data sequences in accordance with the following formula:

$$\mu_{SN0} = \frac{1}{K \sum_{j=1}^{N_s} |R_{ij} - 1|} \sum_{j=1}^{N_s} \sum_{n=(j-1)K}^{jK-1} r_0^2[n]|R_{ij} - 1|,$$

wherein each data sequence of the set of known data sequences is a binary data sequence the data elements of which only take data values which are either 0 or 1,
wherein each data sequence of the set of known data sequences comprises an equal number of $N_S$ data elements,
wherein K corresponds to a number of samples having been determined by sampling for each first signal portion of a first group of first signal portions,
wherein $r_0^2[n]$ refers to a squared n-th channel signal value of the first channel signal, and
wherein $R_{ij}$ is a data value of a j-th data element of an i-th data sequence of the set of known data sequences, the i-th data sequence being said data sequence of the set of known data sequences for which the first signal power value is calculated.

12. The device in accordance with claim 11,
wherein the evaluation unit is configured to calculate the first noise power value of each data sequence of the set of known data sequences in accordance with the following formula:

$$\mu_{N0} = \frac{1}{K \sum_{j=1}^{N_s} R_{ij}} \sum_{j=1}^{N_s} \sum_{n=(j-1)K}^{jK-1} r_0^2[n]R_{ij},$$

wherein K corresponds to a number of samples having been determined by sampling for each first signal portion of the first group of first signal portions and for each third signal portion of a third group of third signal portions.

13. The device in accordance with claim 12,
wherein the evaluation unit is configured to calculate the second signal power value of each data sequence of the set of known data sequences in accordance with the following formula:

$$\mu_{SN1} = \frac{1}{K \sum_{j=1}^{N_s} R_{ij}} \sum_{j=1}^{N_s} \sum_{n=(j-1)K}^{jK-1} r_1^2[n]R_{ij},$$

and the second noise power value of each data sequence of the set of known data sequences in accordance with the following formula:

$$\mu_{N1} = \frac{1}{K \sum_{j=1}^{N_s} |R_{ij} - 1|} \sum_{j=1}^{N_s} \sum_{n=(j-1)K}^{jK-1} r_1^2[n]|R_{ij} - 1|.$$

wherein K corresponds to a number of samples having been determined by sampling for each first signal portion of the first group of first signal portions, for each second signal portion of a second group of second signal portions, for each third signal portion of the third group of third signal portions and for each fourth signal portion of a fourth group of fourth signal portions, and
wherein $r_1^2[n]$ refers to a squared n-th channel signal value of the second channel signal.

14. The device in accordance with claim 1,
wherein the filter unit for filtering the frequency-modulated input signal is configured to acquire the first frequency-filtered channel signal, the second frequency-filtered channel signal and a third frequency-filtered channel signal,
wherein the evaluation unit is configured to associate three channel-specific signal-to-noise distance values to each data sequence of the set of known data sequences,
wherein the evaluation unit is configured to determine, for each known data sequence of a set of known data sequences, a third one of the three channel-specific signal-to-noise distance values associated to said data sequence of the set of known data sequences as a third channel-specific signal-to-noise distance value of said data sequence of the set of known data sequences based on said data sequence of the set of known data sequences and based on the third frequency-filtered channel signal, and wherein the evaluation unit is configured to select a data sequence from the set of known data sequences as the determined data sequence that has an associated channel-specific signal-to-noise distance value which is greater than another channel-specific signal-to-noise distance value associated to another data sequence of the set of known data sequences.

15. The device in accordance with claim 1,
wherein the filter unit for filtering the frequency-modulated input signal is configured to acquire the first frequency-filtered channel signal, the second frequency-filtered channel signal, a third frequency-filtered channel signal, and a fourth frequency-filtered channel signal,
wherein the evaluation unit is configured to associate four channel-specific signal-to-noise distance values to each known data sequence of a set of known data sequences,
wherein the evaluation unit is configured to determine, for each known data sequence of a set of known data sequences, a third one of the four channel-specific signal-to-noise distance values associated to said data sequence of the set of known data sequences as a third channel-specific signal-to-noise distance value of said data sequence of the set of known data sequences based on said data sequence of the set of known data sequences and based on the third frequency-filtered channel signal,
wherein the evaluation unit is configured to determine, for each known data sequence of a set of known data sequences, a fourth one of the four channel-specific signal-to- noise distance values associated to said data sequence of the set of known data sequences as a fourth channel-specific signal-to-noise distance value of said data sequence of the set of known data sequences based on said data sequence of the set of known data sequences and based on the fourth frequency-filtered channel signal,
wherein the evaluation unit is configured to select a data sequence from the set of known data sequences as the determined data sequence that has an associated channel-specific signal-to-noise distance value which is greater than another channel-specific signal-to-noise distance value associated to another data sequence of the set of known data sequences.

16. The device in accordance with claim 1, the device being configured to determine an encoded data sequence encoded by the frequency-modulated input signal which is frequency-modulated by the modulation rule, the modulation rule being frequency-shift keying.

17. The device in accordance with claim 16, the device being configured to determine an encoded data sequence encoded by the frequency-modulated input signal which is frequency-modulated by 4-FSK, 4-FSK being the modulation rule.

18. The device in accordance with claim 16, the device being configured to determine an encoded data sequence encoded by the frequency-modulated input signal which is frequency-modulated by 8-FSK, 8-FSK being the modulation rule.

19. The device in accordance with claim 1,
wherein the evaluation unit comprises a first squaring unit for squaring the first frequency-filtered channel signal in order to acquire a first squared channel signal, wherein the evaluation unit comprises a second squaring unit for squaring the second frequency-filtered channel signal in order to acquire a second squared channel signal,
wherein the evaluation unit additionally comprises a storage unit for storing the set of known data sequences,
wherein the evaluation unit additionally comprises a first signal-to-noise distance determining unit in order to acquire, for each data sequence of the set of known data sequences, the first channel-specific signal-to-noise distance value of said data sequence of the set of known data sequences based on said data sequence of the set of known data sequences and based on the first squared channel signal,
wherein the evaluation unit additionally comprises a second signal-to-noise distance determining unit in order to acquire, for each data sequence of the set of known data sequences, the second channel-specific signal-to-noise distance value of said data sequence of the set of known data sequences based on said data sequence of the set of known data sequences and based on the second squared channel signal,
wherein the evaluation unit additionally comprises an argmax unit for determining a maximum signal-to-noise distance value, and
wherein the evaluation unit additionally comprises a data sequence determining unit in order to select that data sequence of the set of known data sequences as the determined data sequence that has the maximum signal-to-noise distance value associated.

20. The device in accordance with claim 1,
wherein the device additionally comprises a channel estimate output unit,
wherein the channel estimate output unit is configured to output the first channel-specific signal-to-noise distance value of the determined data sequence as a first channel estimate of a first channel, and
wherein the channel estimate output unit is configured to output the second channel-specific signal-to-noise distance value of the determined data sequence as a second channel estimate of a second channel.

21. A device for recognizing a network address encoded by a frequency-modulated input signal, comprising:
an interface unit for receiving the frequency-modulated input signal, and
a device in accordance with claim 1 for determining a data sequence encoded by the frequency-modulated input signal which comprises a plurality of data elements, the encoded data sequence designating a network address,
wherein the evaluation unit of the device in accordance with claim 1 is configured to determine a data sequence signal-to-noise distance value for each known data sequence of a set of known data sequences, wherein each known data sequence of the set of known data sequences designates a network address each.

22. A method for determining an encoded data sequence as a determined data sequence, the encoded data sequence being encoded by an input signal frequency-modulated in accordance with a modulation rule, the encoded data sequence comprising a plurality of data elements, comprising:
filtering the frequency-modulated input signal in order to acquire a first frequency- filtered channel signal and a second frequency-filtered channel signal,
determining, for each data sequence of a set of known data sequences, a first channel-specific signal-to-noise distance value of two channel-specific signal-to-noise distance values based on said data sequence and based on the first frequency-filtered channel signal, and associating said first channel-specific signal-to-noise distance value of the two-channel-specific distance values to said data sequence, determining, for each data sequence of the set of known data sequences, a second channel-specific signal-to-noise distance value of the two channel-specific signal-to-noise distance values based on said data sequence and based on the second frequency-filtered channel signal, and associating said second channel-specific signal-to-noise distance value of the two-channel-specific distance values to said data sequence, and selecting from the set of known data sequences a data sequence as the determined data sequence that has an associated channel-specific signal-to-noise distance value which is greater than another channel-specific signal-to-noise distance value associated to another one of the known data sequences.

23. A non-transitory computer-readable medium comprising a computer program for performing the method in accordance with claim 22 when the computer program is executed on a computer or signal processor.

* * * * *

UNITED STATES PATENT AND TRADEMARK OFFICE
CERTIFICATE OF CORRECTION

PATENT NO. : 9,450,793 B2
APPLICATION NO. : 14/647757
DATED : September 20, 2016
INVENTOR(S) : Matthias Kuba et al.

It is certified that error appears in the above-identified patent and that said Letters Patent is hereby corrected as shown below:

Claim 19, Column 34, Lines 30/31, "...the maximum signal-to-noise distance value associated."
should read "...the maximum signal-to-noise distance value."

Signed and Sealed this
Sixth Day of June, 2017

Michelle K. Lee
*Director of the United States Patent and Trademark Office*